US012442870B2

(12) United States Patent
Shirakawa et al.

(10) Patent No.: US 12,442,870 B2
(45) Date of Patent: Oct. 14, 2025

(54) COUPLING CAPACITANCE ESTIMATION METHOD, METHOD FOR IDENTIFYING CORRESPONDING ENDS OF MULTICORE CABLE, AND METHOD FOR MANUFACTURING MULTICORE CABLE ASSEMBLY

(71) Applicant: Hitachi Metals, Ltd., Tokyo (JP)

(72) Inventors: Yohei Shirakawa, Tokyo (JP); Seiji Kojima, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 684 days.

(21) Appl. No.: 17/701,279

(22) Filed: Mar. 22, 2022

(65) Prior Publication Data

US 2022/0317207 A1 Oct. 6, 2022

(30) Foreign Application Priority Data

Mar. 26, 2021 (JP) .................................. 2021-053324

(51) Int. Cl.
*G01R 31/28* (2006.01)
*G01R 31/67* (2020.01)
*H01B 7/00* (2006.01)

(52) U.S. Cl.
CPC ........... *G01R 31/67* (2020.01); *H01B 7/0009* (2013.01)

(58) Field of Classification Search
CPC .... G01R 31/60; G01R 31/67; G01R 27/2605; H01B 7/0009; H01B 7/228
See application file for complete search history.

(56) References Cited

U.S. PATENT DOCUMENTS

| | | | | |
|---|---|---|---|---|
| 5,384,540 A | * | 1/1995 | Dessel | G01R 31/60 324/66 |
| 5,592,344 A | * | 1/1997 | Tsuruoka | G11B 5/03 360/68 |
| 9,934,867 B2 | * | 4/2018 | Asadi | G01R 27/2605 |
| 10,962,607 B2 | | 3/2021 | Shirakawa et al. | |
| 2019/0212379 A1 | | 7/2019 | Shirakawa et al. | |

FOREIGN PATENT DOCUMENTS

JP 2019-120608 A 7/2019

* cited by examiner

*Primary Examiner* — Paul D Kim
(74) *Attorney, Agent, or Firm* — MCGINN I.P. LAW GROUP, PLLC

(57) ABSTRACT

A coupling capacitance estimation method includes arranging numerous input electrodes to respectively face first exposed end portions of numerous insulated wires exposed at one end of a multicore cable, arranging numerous output electrodes to respectively face second exposed end portions of the numerous insulated wires exposed at another end of the multicore cable, performing measurement of a voltage value of a measurement output signal that is output by capacitive coupling from the second exposed end portion through the output electrode when a measurement input signal is input by capacitive coupling from the input electrode to the first exposed end portion, with a plurality of predetermined different combinations of the input electrodes to input the measurement input signal and the output electrodes to output the measurement output signal, and based on the measured voltage values of a plurality of the measurement output signals, estimating respective coupling capacitances.

5 Claims, 11 Drawing Sheets

COUPLING CAPACITANCE ESTIMATION METHOD, METHOD FOR IDENTIFYING CORRESPONDING ENDS OF MULTICORE CABLE, AND METHOD FOR MANUFACTURING MULTICORE CABLE ASSEMBLY

CROSS-REFERENCE TO RELATED APPLICATIONS

The present patent application claims the priority of Japanese patent application No. 2021-053324 filed on Mar. 26, 2021, and the entire contents thereof are hereby incorporated by reference.

TECHNICAL FIELD

The present invention relates to a coupling capacitance estimation method, a method for identifying corresponding ends of a multicore cable, a coupling capacitance estimation device, and a method for manufacturing a multicore cable assembly.

BACKGROUND ART

As a multicore cable in which numerous insulated wires are collectively covered with a sheath (i.e., jacket), there is a cable which is used in, e.g., medical equipment such as gastroscope or ultrasonic diagnostic equipment and have several hundreds of insulated wires arranged within the sheath. The numerous insulated wires of such a multicore cable include numerous first exposed end portions exposed from the sheath on one side and numerous second exposed end portions exposed from the sheath on the other side. The numerous first exposed end portions and the numerous second exposed end portions are electrically connected to connection target members such as connector, circuit board, etc.

Here, to ensure appropriate electrical connections between the multicore cable and the connection target members such as connector, circuit board, etc., to be connected to both ends of the multicore cable, correspondence relations between the numerous first exposed end portions and the numerous second exposed end portions, i.e., which first exposed end portion is connected to which second exposed end portion needs to be identified in advance.

Therefore, Patent Literature 1 discloses a method for electrically identifying the first exposed end portions and the corresponding second exposed end portions by inputting a test signal one by one to the numerous first exposed end portions and identifying the second exposed end portion which outputs the test signal. In the method described in Patent Literature 1, an input electrode is placed above an insulation cover of each first exposed end portion and an output electrode is placed above an insulation cover of each second exposed end portion. Then, an AC test signal is input from the input electrode to the first exposed end portion by capacitive coupling, and an AC test output is output from the second exposed end portion to the output electrode by capacitive coupling. This allows a contactless electrical connection between each electrode and a conductor of the insulated wire, and correspondence relations between the first exposed end portions and the second exposed end portions can be easily identified in a short time.

However, when the AC test signal is input to the conductor of the insulated wire of the multicore cable in which the insulated wires are highly densely arranged inside the sheath, crosstalk between the insulated wires is likely to increase and there is thus concern that the correspondence relations between the first exposed end portions and the second exposed end portions cannot be accurately identified.

For this reason, in the method described in Patent Literature 1, a test input signal is input from the input electrode to the first exposed end portion under test, and also an auxiliary signal with an opposite phase to the test input signal is input to the first exposed end portion that is different from the first exposed end portion under test. Then, based on a voltage value of an output signal that is output at this time from each second exposed end portion by capacitive coupling, the correspondence relation between the first exposed end portion and the second exposed end portion is identified. Patent Literature 1 describes that such a method can suppress an effect of crosstalk when identifying the correspondence relations between the first exposed end portions and the second exposed end portions.

CITATION LIST

Patent Literature

Patent Literature 1: JP 2019-120608A

SUMMARY OF THE INVENTION

However, variation in coupling capacitances between the numerous insulated wires and the electrodes (i.e., the input electrodes and the output electrodes) facing each other may occur. The causes of the variation in coupling capacitance are as follows.

For example, if a variation in diameter of the numerous the insulated wires occurs due to tolerance, a variation in distance between the numerous insulated wires and the electrodes facing each other will occur, resulting in a variation in the coupling capacitances between the numerous insulated wires and the electrodes facing each other. In addition, if the positions of some of the insulated wires relative to the electrodes shift in a direction orthogonal to a longitudinal direction of the insulated wires, the facing area between these some of the insulated wires and the electrodes decreases, resulting in a variation in the coupling capacitances between the numerous insulated wires and the electrodes facing each other. Furthermore, when foreign matter enters between some of the insulated wires and the electrodes, distances between these some of the insulated wires and the electrodes increase, resulting in a variation in the coupling capacitances between the numerous insulated wires and the electrodes facing each other.

It is therefore useful to know coupling capacitances between the numerous insulated wires and the electrodes facing each other beforehand, but Patent Literature 1 does not state about this, hence, there is room for improvement.

The invention was made in view of such circumstances and it is an object of the invention to provide a coupling capacitance estimation method, a method for identifying corresponding ends of a multicore cable, a coupling capacitance estimation device and a method for manufacturing a multicore cable assembly, which are capable of estimating coupling capacitances between input electrodes and first exposed end portions facing each other and coupling capacitances between output electrodes and second exposed end portions facing each other.

So as to achieve the above object, one aspect of the invention provides: a coupling capacitance estimation method, comprising:

arranging numerous input electrodes so as to respectively face first exposed end portions of numerous insulated wires exposed at one end of a multicore cable;

arranging numerous output electrodes so as to respectively face second exposed end portions of the numerous insulated wires exposed at another end of the multicore cable;

performing measurement of a voltage value of a measurement output signal that is output by capacitive coupling from the second exposed end portion through the output electrode when a measurement input signal is input by capacitive coupling from the input electrode to the first exposed end portion, with a plurality of predetermined different combinations of the input electrodes to input the measurement input signal and the output electrodes to output the measurement output signal; and based on the measured voltage values of a plurality of the measurement output signals, estimating respective coupling capacitances between the numerous input electrodes and the numerous first exposed end portions facing each other and respective coupling capacitances between the numerous output electrodes and the numerous second exposed end portions facing each other.

So as to achieve the above object, another aspect of the invention provides: a method for identifying corresponding ends of a multicore cable that is a method for identifying correspondence relations between the numerous first exposed end portions and the numerous second exposed end portions by using the coupling capacitance estimation method according to claim 1, the method comprising:

inputting an identification input signal by capacitive coupling from the input electrode to the first exposed end portion as an input-side identification target among the numerous first exposed end portions, also inputting an auxiliary signal with an opposite phase to the identification input signal, by capacitive coupling, from the input electrode to the first exposed end portion among the numerous first exposed end portions except the first exposed end portion as the input-side identification target, and measuring voltage values of identification output signals that are output by capacitive coupling respectively from the numerous second exposed end portions through the output electrodes;

calculating correction voltage values by multiplying the respective voltage values of the identification output signals measured at the numerous second exposed end portions by a correction coefficient calculated using estimated values of coupling capacitances estimated by the coupling capacitance estimation method; and based on the calculated correction voltage values, identifying the second exposed end portion corresponding to the first exposed end portion as the input-side identification target.

So as to achieve the above object, a still another aspect of the invention provides: a coupling capacitance estimation device, comprising:

numerous input electrodes arranged so as to respectively face first exposed end portions of numerous insulated wires exposed at one end of a multicore cable;

numerous output electrodes arranged so as to respectively face second exposed end portions of the numerous insulated wires exposed at another end of the multicore cable;

a measurement unit to perform measurement of a voltage value of a measurement output signal that is output by capacitive coupling from the second exposed end portion through the output electrode when a measurement input signal is input by capacitive coupling from the input electrode to the first exposed end portion, with a plurality of predetermined different combinations of the input electrodes to input the measurement input signal and the output electrodes to output the measurement output signal; and an estimation unit to estimate, based on the voltage values of the measurement output signals measured by the measurement unit, respective coupling capacitances between the numerous input electrodes and the numerous first exposed end portions facing each other and respective coupling capacitances between the numerous output electrodes and the numerous second exposed end portions facing each other.

So as to achieve the above object, a further aspect of the invention provides: a method for manufacturing a multicore cable assembly that comprises a multicore cable comprising numerous insulated wires and an outer covering collectively covering the numerous insulated wires, a first connection target member electrically connected to first exposed end portions of the numerous insulated wires exposed from the outer covering at one end of the multicore cable, and a second connection target member electrically connected to second exposed end portions of the numerous insulated wires exposed from the outer covering at another end of the multicore cable, the method comprising:

identifying which second exposed end portion corresponds to the first exposed end portion as the input-side identification target among the numerous first exposed end portions; and based on identification results for the numerous first exposed end portions and the numerous second exposed end portions by the identifying, electrically connecting the numerous first exposed end portions to the first connection target member and electrically connecting the numerous second exposed end portions to the second connection target member, wherein the identifying comprises:

arranging numerous input electrodes so as to respectively face the numerous first exposed end portions, arranging numerous output electrodes so as to respectively face the numerous second exposed end portions, performing measurement of a voltage value of a measurement output signal that is output by capacitive coupling from the second exposed end portion through the output electrode when a measurement input signal is input by capacitive coupling from the input electrode to the first exposed end portion, with a plurality of predetermined different combinations of the input electrodes to input the measurement input signal and the output electrodes to output the measurement output signal, estimating respective coupling capacitances between the numerous input electrodes and the numerous first exposed end portions facing each other and respective coupling capacitances between the numerous output electrodes and the numerous second exposed end portions facing each other based on the measured voltage values of a plurality of the measurement output signals, inputting an identification input signal by capacitive coupling from the input electrode to the first exposed end portion as the input-side identification target among the numerous first exposed end portions, also inputting an auxiliary signal with an opposite phase to the identification input signal, by capacitive coupling, from the input electrode to the first exposed end portion among the numerous first exposed end portions except the first exposed end portion as the input-side identification target, and measuring voltage values of identification output signals that are output by capacitive coupling respectively from the numerous second exposed end portions through the output electrodes, calculating correction voltage values by multiplying the respective voltage values of the identification output signals measured at the numerous second exposed end portions by a correction coefficient calculated using estimated values of the coupling capacitances, and based on the calculated correction voltage values, identifying the second exposed end portion corresponding to the first exposed end portion as the input-side identification target.

Effects of the Invention

According to the invention, it is possible to provide a coupling capacitance estimation method, a method for identifying corresponding ends of a multicore cable, a coupling capacitance estimation device and a method for manufacturing a multicore cable assembly, which are capable of estimating coupling capacitances between input electrodes and first exposed end portions facing each other and coupling capacitances between output electrodes and second exposed end portions facing each other.

BEST MODE FOR CARRYING OUT THE INVENTION

First Embodiment

The first embodiment of the invention will be described in reference to FIGS. 1 to 15. Note that, embodiments below are described as preferred examples for implementing the invention. Although some part of the embodiments specifically illustrates various technically preferable matters, the technical scope of the invention is not limited to such specific aspects.

(Multicore Cable 8)

Figure 1:
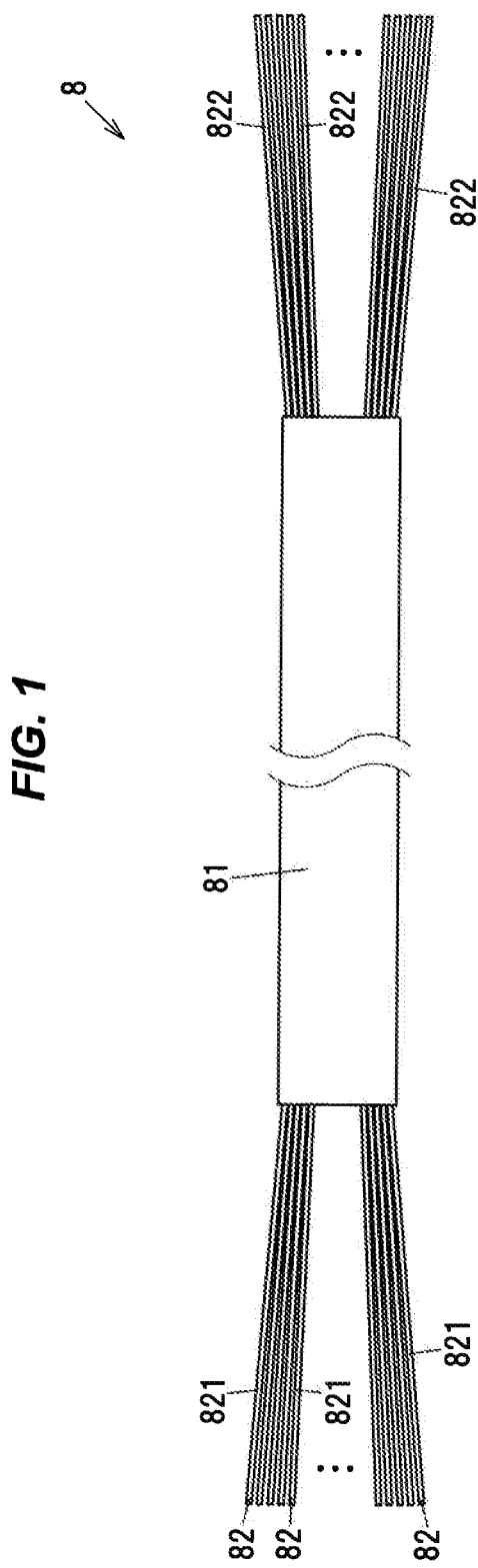
FIG. 1 is a schematic plan view showing a multicore cable in the first embodiment.
Figure 2:
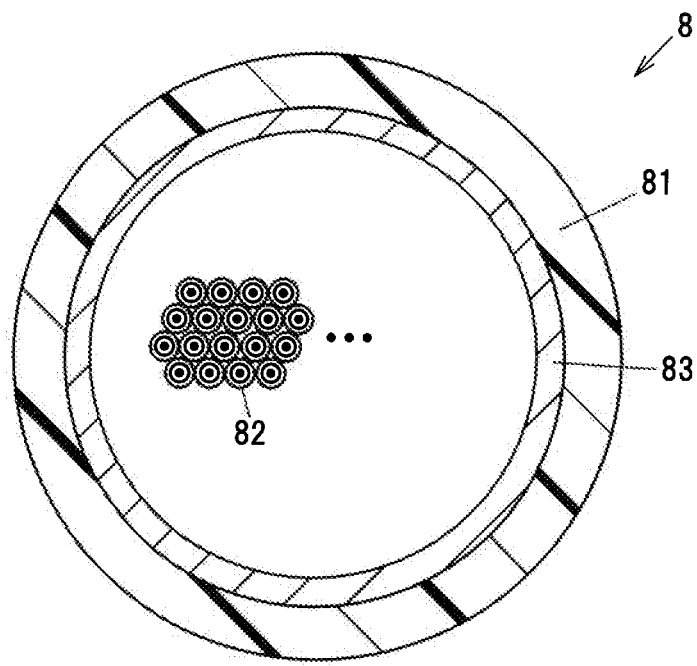
FIG. 2 is a schematic cross-sectional view showing the multicore cable in the first embodiment.
Figure 3:
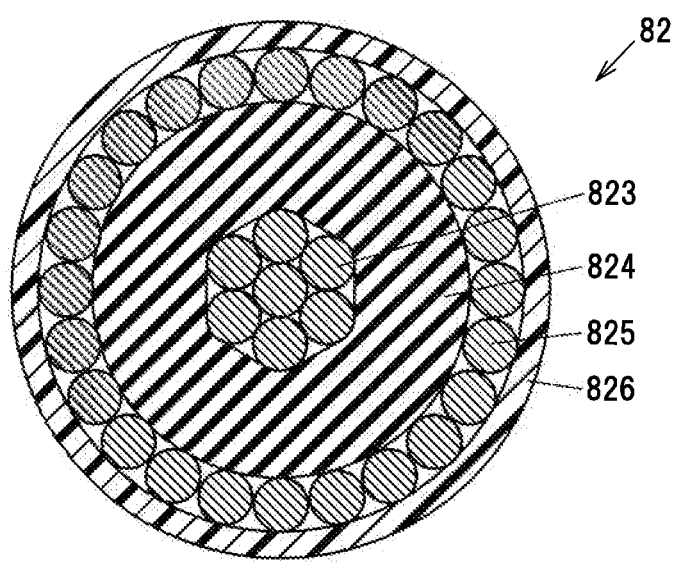
FIG. 3 is a schematic cross-sectional view showing an insulated wire in the first embodiment.

FIG. 1 is a schematic plan view showing a multicore cable 8. FIG. 2 is a schematic cross-sectional view showing the multicore cable 8. FIG. 3 is a schematic cross-sectional view showing an insulated wire 82. As shown in FIGS. 1 and 2, the multicore cable 8 includes a sheath 81 and numerous insulated wires 82 collectively covered with the sheath 81. As shown in FIG. 1, each insulated wire 82 has a first exposed end portion 821 exposed from the sheath 81 on one side and a second exposed end portion 822 exposed from the sheath 81 on the other side. As shown in FIG. 2, the numerous insulated wires 82 are covered with a shield portion 83 such as braided shield, and the shield portion 83 is covered with the sheath 81 which constitutes the outermost layer of the multicore cable 8.

As shown in FIG. 3, the insulated wire 82 is a coaxial wire in which an insulation 824, an outer conductor 825 and a covering 826 are sequentially provided around a center conductor 823. However, the insulated wire 82 is not limited thereto and may be an insulated wire that does not have the insulation 824 and the outer conductor 825. The insulated wire 82 in the first embodiment is an extrafine (superfine) electric wire with an outer diameter of, e.g., not less than 0.2 mm and not more than 0.5 mm.

An outer diameter of the multicore cable 8, i.e., an outer diameter of the sheath 81 is, e.g., about 10 mm. The multicore cable 8 has not less than three insulated wires 82. The multicore cable 8 preferably includes not less than twenty insulated wires 82, more preferably, not less than one hundred insulated wires 82. When the number of the insulated wires 82 is not less than twenty, it is difficult to distinguish the numerous insulated wires 82 by color when identifying correspondence relations between the numerous first exposed end portions 821 and the numerous second exposed end portions 822 of the multicore cable 8. Therefore, an effect of electrically identifying the correspondence relations between the numerous first exposed end portions 821 and the numerous second exposed end portions 822 is significant, as described later. Meanwhile, when the number of the insulated wires 82 is not less than one hundred, density of the insulated wires 82 inside the sheath 81 is high and concern of crosstalk increases. Therefore, it is difficult to increase accuracy of identifying the correspondence relations between the numerous first exposed end portions 821 and the numerous second exposed end portions 822 unless special measures are taken. In the first embodiment, since accuracy of identifying the correspondence relations between the numerous first exposed end portions 821 and the numerous second exposed end portions 822 can be increased as described later, the effect is more significant when the number of the insulated wires 82 is not less than one hundred. In the multicore cable 8 of the first embodiment, e.g., not less than one hundred and not more than three hundred of the insulated wires 82 are twisted together inside the sheath 81.

(Test Device 1 for Testing the Multicore Cable 8)

Figure 4:
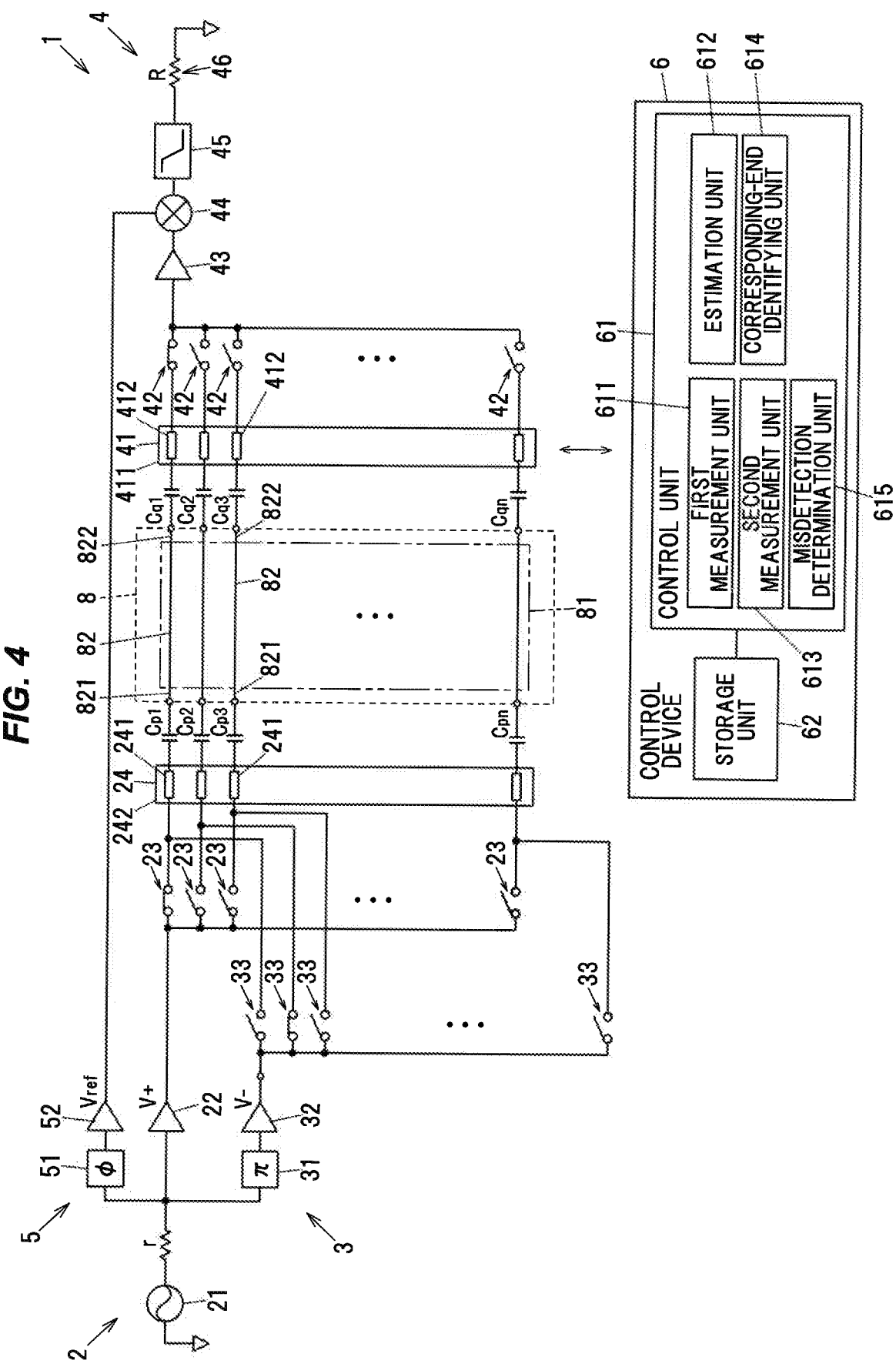
FIG. 4 is a schematic general configuration diagram illustrating a test device in the first embodiment.

FIG. 4 is a schematic general configuration diagram illustrating a test device 1. The test device 1 for testing the multicore cable 8 is a device to identify the correspondence relations between the numerous first exposed end portions 821 and the numerous second exposed end portions 822 of the multicore cable 8. That is, although it is difficult to identify which first exposed end portion 821 is connected to which second exposed end portion 822 (i.e., difficult to identify the correspondence relation) since the multicore cable 8 has the numerous insulated wires 82 arranged within the sheath 81, the test device 1 in the first embodiment can highly accurately identify the correspondence relations between the numerous first exposed end portions 821 and the numerous second exposed end portions 822.

Then, based on the identified correspondence relations between the numerous first exposed end portions 821 and the numerous second exposed end portions 822, the numerous first exposed end portions 821 are electrically connected to appropriate locations on a first connection target member and the numerous second exposed end portions 822 are electrically connected to appropriate locations on a second connection target member, thereby obtaining a multicore cable assembly. One of the first connection target member and the second connection target member can be, e.g., a connector having numerous terminals to be electrically connected to the numerous insulated wires, and the other can be a circuit board, etc., having numerous patterns to be electrically connected to the numerous wires. Then, the multicore cable assembly can constitute, e.g., medical equipment such as gastroscope or ultrasonic diagnostic equipment.

The test device 1 for testing the multicore cable 8 includes a main input circuit 2, an auxiliary input circuit 3, an output circuit 4, a reference signal generating circuit 5, and a control device 6. Next, each constituent element will be described in detail.

(Main Input Circuit 2)

The main input circuit 2 includes a voltage source 21, a main amplifier 22, main input switch devices 23, and an input board 24. The voltage source 21 is an AC source. In FIG. 4, an internal resistance of the voltage source 21 is indicated by the sign r. The main amplifier 22 amplifies an output of the voltage source 21 and generates a main output signal V+ to be input to the insulated wires 82. The main output signal V+ is a measurement input signal or an identification input signal. As will be described later, the measurement input signal is a signal which is input to the first exposed end portions 821 at the time of estimating respective coupling capacitances $C_{px}$ between numerous input electrodes 242 and the numerous first exposed end portions 821 and respective coupling capacitances $C_{qx}$ between numerous output electrodes 412 and the numerous second exposed end portions 822. The symbol x in the coupling capacitance $C_{px}$ and the coupling capacitance $C_{qx}$ means a value from 1 to the total number n of the insulated wires 82. The identification input signal is a signal which is input to the first exposed end portions 821 at the time of identifying the correspondence relations between the numerous first exposed end portions 821 and the numerous second exposed end portions 822. A frequency of the main output signal V+ needs to be lower than a resonant frequency of the multicore cable 8 and can be appropriately set according to the structure, etc., of the multicore cable 8. In the first embodiment, the frequency of the main output signal V+ is, e.g., not less than 10 MHz, and in particular, the main output signal V+ at 2.5 MHz is used.

The number of the main input switch devices 23 provided is the same as the number of the numerous insulated wires 82. The numerous main input switch devices 23 are arranged parallel to the main amplifier 22. By appropriately regulating the ON/OFF state of each of the numerous main input switch devices 23, the main output signal V+ is input to only the desired insulated wire 82. The numerous main input switch devices 23 are electrically connected, on the opposite side to the voltage source 21, to different input electrodes 242 of the input board 24.

Figure 5:
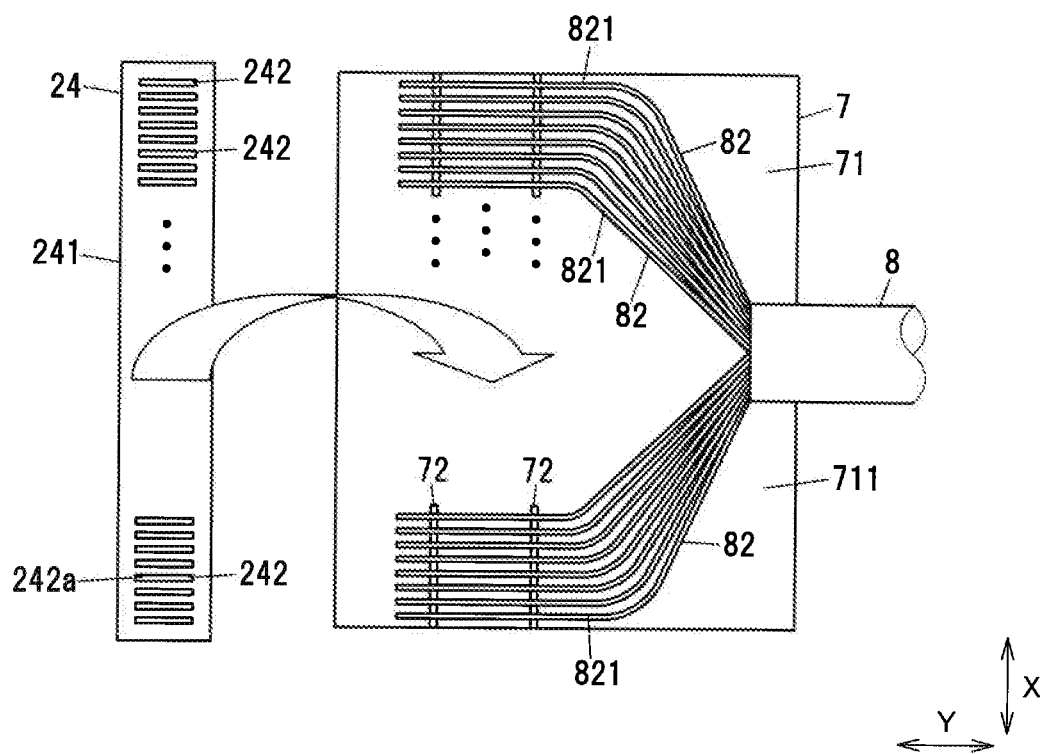
FIG. 5 is a schematic plan view showing numerous first exposed end portions fixed to a test bench and an input board in the first embodiment.
Figure 6:
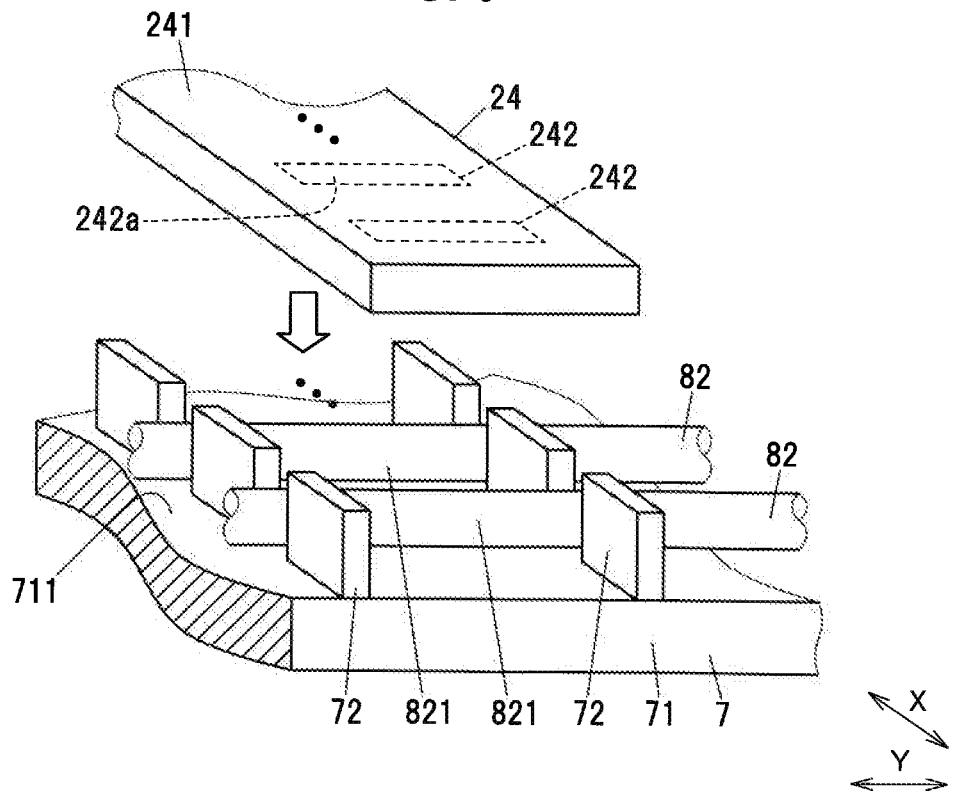
FIG. 6 is a schematic perspective view showing the numerous first exposed end portions fixed to the test bench and the input board in the first embodiment.

FIG. 5 is a schematic plan view showing the numerous first exposed end portions 821 fixed to a test bench 7 and the input board 24. FIG. 6 is a schematic perspective view showing the numerous first exposed end portions 821 fixed to the test bench 7 and the input board 24. The input board 24 includes a substrate 241 with electrical insulating properties, and the input electrodes 242 composed of wiring patterns formed on the substrate 241. The number of the input electrodes 242 formed on the substrate 241 at equal intervals is at least the same number as the number of the insulated wires 82. It is designed such that electrode surfaces 242a of the input electrodes 242 on the opposite side to the substrate 241 are arranged in the same plane. The electrode surfaces 242a of the numerous input electrodes 242 of the input board 24 are pressed against the numerous aligned first exposed end portions 821, as described later. Then, the main output signal V+ is input, by capacitive coupling, from the input electrode 242 connected to the main input switch device 23 in the ON state to the insulated wire 82 through the first exposed end portion 821 facing this input electrode 242.

As shown in FIGS. 5 and 6, the numerous aligned first exposed end portions 821 are fixed to the test bench 7. The test bench 7 includes a base 71, and positioning walls 72 provided upright upwardly from a base upper surface 711. Numerous positioning walls 72 are arranged at predetermined intervals in an alignment direction X of the first exposed end portions 821, and the first exposed end portions 821 are positioned between the positioning walls 72 adjacent in the alignment direction X. The positioning walls 72 fix the positions of the first exposed end portions 821 at two positions in a longitudinal direction Y that is a direction parallel to the base upper surface 711 and orthogonal to the alignment direction X. The positioning walls 72 at two positions in the longitudinal direction Y face each other in the longitudinal direction Y. However, the structure to fix the insulated wires 82 to the test bench 7 is not limited thereto.

For example, the insulated wires 82 may be adhesively fixed to the base upper surface 711 by using an adhesive tape such as double-sided tape. In addition, although the first exposed end portions 821 are arranged in a row at equal intervals in one direction in the first embodiment, how to arrange the insulated wires 82 on the base upper surface 711 may be appropriately changed.

As shown in FIG. 6, each input electrode 242 of the input board 24 is pressed against a portion of the first exposed end portion 821 located between the positioning walls 72 provided at two positions in the longitudinal direction Y. When the main output signal V+ is input to a predetermined input electrode 242 in this state, the main output signal V+ is input by capacitive coupling from the first exposed end portion 821 facing this input electrode 242 to the insulated wire 82. In this regard, since the coaxial wire is used as the insulated wire 82 in the first embodiment, the main output signal V+ is input to the outer conductor 825 of the insulated wire 82.

Figure 7:
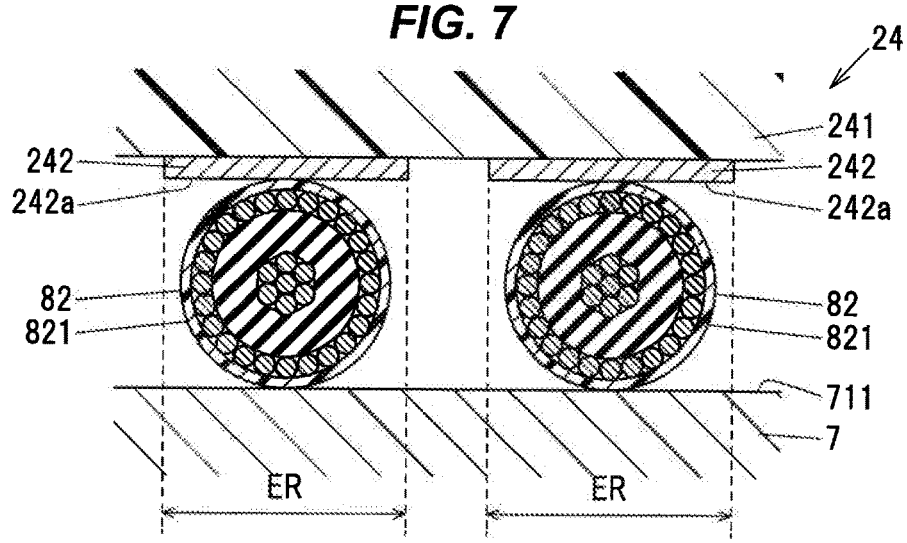
FIG. 7 is a schematic cross-sectional view showing the test bench, plural insulated wires and the input board in the first embodiment when in a normal state.
Figure 8:
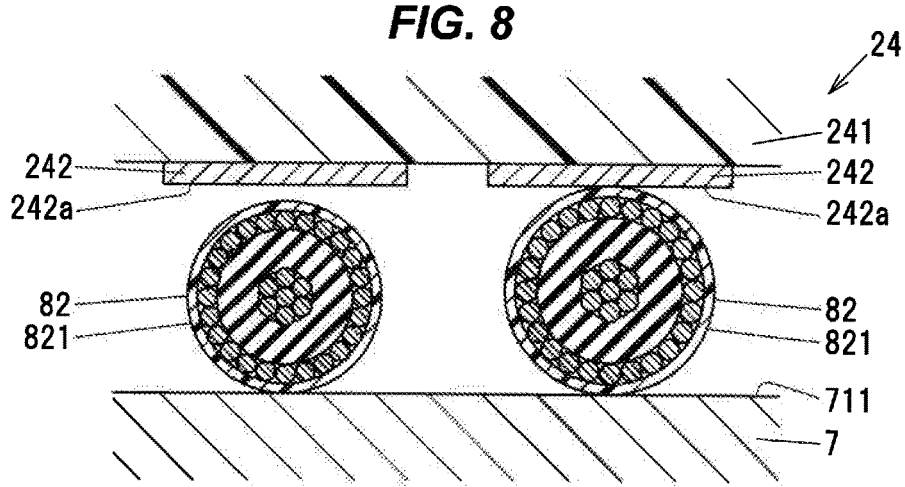
FIG. 8 is a schematic cross-sectional view showing the test bench, plural insulated wires and the input board in the first embodiment when some of the numerous insulated wires have a smaller diameter.
Figure 9:
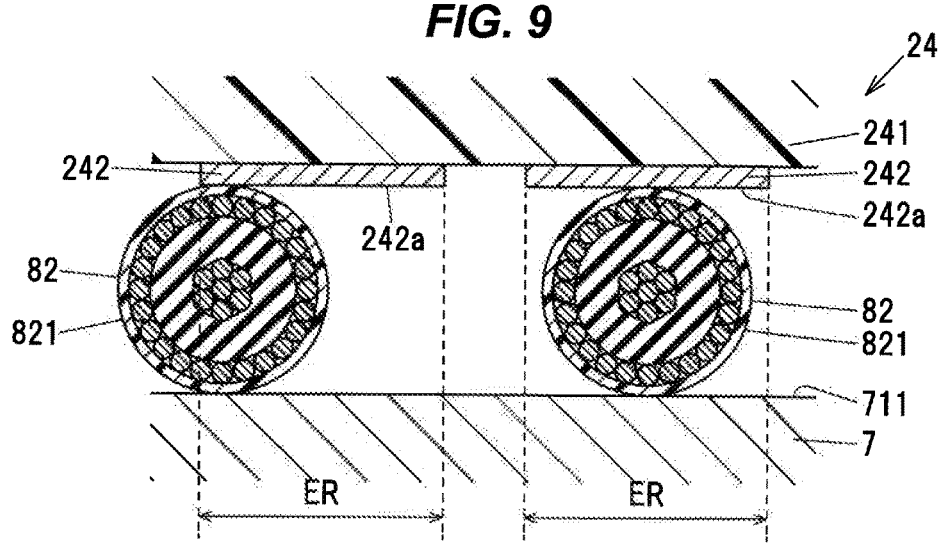
FIG. 9 is a schematic cross-sectional view showing the test bench, plural insulated wires and the input board in the first embodiment when positions of some of the numerous insulated wires in an alignment direction are out of alignment relative to input electrodes.

FIG. 7 is a schematic cross-sectional view showing the test bench 7, plural insulated wires 82 and the input board 24 when in a normal state. FIG. 8 is a schematic cross-sectional view showing the test bench 7, plural insulated wires 82 and the input board 24 when some of the numerous insulated wires 82 have a smaller diameter. FIG. 9 is a schematic cross-sectional view showing the test bench 7, plural insulated wires 82 and the input board 24 when positions of some of the numerous insulated wires 82 in the alignment direction X are out of alignment relative to input electrodes 242.

As shown in FIG. 7, each of the insulated wires 82 is manufactured so as to have the same diameter and is arranged so as to be located within an electrode surface region ER in the alignment direction X where the electrode surface 242a of the input electrode 242 facing thereto is present.

However, each insulated wire 82 is an extrafine electric wire as mentioned above and manufacturing errors in diameter may occur. In this case, as shown in FIG. 8, a gap is formed between the first exposed end portion 821 of an insulated wire 820a with a relatively smaller diameter among the numerous insulated wires 82 and the input electrode 242 facing such a first exposed end portion 821. This results in that coupling capacitance between the first exposed end portion 821 of the insulated wire 820a with a relatively smaller diameter and the input electrode 242 facing such a first exposed end portion 821 becomes smaller than coupling capacitances between the other first exposed end portions 821 and the input electrodes 242 facing thereto.

Meanwhile, it is conceivable that some first exposed end portions 821a among the numerous first exposed end portions 821 are arranged partially out of the electrode surface region ER in the alignment direction X due to an assembly error caused when arranging the first exposed end portions 821 on the test bench 7, as shown in FIG. 9. In this case, a facing area between the first exposed end portion 821a and the input electrode 242 is reduced by the amount out of the electrode surface region ER, and coupling capacitance between the first exposed end portion 821a and the input electrode 242 decreases.

Due to the causes described above, a variation in respective coupling capacitances between the numerous first exposed end portions 821 and the numerous input electrodes 242 may occur, which may adversely affect the identification of the first exposed end portions 821 and the second exposed end portions 822 of the numerous insulated wires 82. The same applies to the relations between the second exposed end portions 822 and the output electrodes 412 (described later).

(Auxiliary Input Circuit 3)

The auxiliary input circuit 3 is a circuit to input an auxiliary signal V− (described later) by capacitive coupling to, among the numerous first exposed end portions 821, the first exposed end portion 821 that is not the first exposed end portion 821 to which the identification input signal is input. As shown in FIG. 4, the auxiliary input circuit 3 includes a phase inverter 31, an auxiliary amplifier 32, and auxiliary switch devices 33.

The phase inverter 31 is connected to the voltage source 21 so as to be parallel to the main amplifier 22. The phase inverter 31 is composed of a phase shifter that shifts a phase of the output of the voltage source 21 by 180 degrees. The auxiliary amplifier 32 amplifies an output of the phase inverter 31 and generates the auxiliary signal V−.

The number of the auxiliary switch devices 33 provided is the same as the number of the numerous insulated wires 82. The numerous auxiliary switch devices 33 are arranged parallel to the auxiliary amplifier 32. By appropriately regulating the ON/OFF state of each of the numerous auxiliary switch devices 33, the auxiliary signal V− is input to only a predetermined insulated wires 82 that is not the insulated wire 82 to which the identification input signal is input. In this way, accuracy of identifying the correspondence relations is improved by inputting the auxiliary signal V− to the insulated wire 82 separately from the identification input signal at the time of identifying the correspondence relations between the numerous first exposed end portions 821 and the numerous second exposed end portions 822, and it is as disclosed in JP 2019-120608A. The numerous auxiliary switch devices 33 are electrically connected, on the opposite side to the voltage source 21, to different input electrodes 242 of the input board 24.

Although the auxiliary signal V− is generated by inverting the phase of the voltage source 21 of the main input circuit 2 in the first embodiment, it is not limited thereto and another voltage source 21 to generate the auxiliary signal V− may be separately provided. In addition, although the phase-inverted test signal is input to the insulated wires 82 via the input board 24 in the first embodiment, it is not limited thereto and another board to input the auxiliary signal V− may be separately used.

(Output Circuit 4)

The output circuit 4 includes an output board 41, output switch devices 42, an output amplifier 43, a multiplier 44, a low-pass filter 45, and a load resistor 46. The output board 41 includes a substrate 411 and the output electrodes 412 composed of wiring patterns formed on the substrate 411. The configuration of the output board 41 is the same as the configuration of the input board 24 and the overlapping explanation will be omitted. The output electrodes 412 of the output board 41 are pressed against the aligned second exposed end portions 822 of the numerous insulated wires 82, in the same manner as the configuration shown in FIGS. 5 and 6. The numerous aligned second exposed end portions 822 are fixed to a test bench same as the test bench 7 described above, in the same manner as the numerous first exposed end portions 821. Then, output signals from the insulated wires 82 (signals from the input electrodes 242 and output through the outer conductors 825 of the insulated wires 82) are output from the output electrodes 412 by capacitive coupling. The numerous output electrodes 412 are electrically connected to the output switch devices 42.

As shown in FIG. 4, the number of the output switch devices 42 provided is the same as the number of the numerous insulated wires 82. The numerous output switch devices 42 are electrically connected to different output electrodes 412. By appropriately regulating the ON/OFF state of each of the numerous output switch devices 42, the signal is output from only the desired insulated wire 82. The output sides of the numerous output switch devices 42 are parallel connected to the output amplifier 43. The output amplifier 43 amplifies a signal output from the output switch device 42 in the ON state among the numerous output switch devices 42 and output it to the multiplier 44 side.

The multiplier 44 is a mixer that multiplies an output from the output electrode 412 by an output of the reference signal generating circuit 5. The reference signal generating circuit 5 generates a reference signal with the same phase as a signal output from the output electrode 412, and the multiplier 44 multiplies the signal output from the output electrode 412 by an output signal of the reference signal generating circuit 5 having the same phase. When the signal output from the output electrode 412 and the output signal of the reference signal generating circuit 5 having the same phase are multiplied by the multiplier 44, a DC component and a component with a frequency twice that of the signal output from the output electrode 412 are generated. Thus, the low-pass filter 45 to which an output signal of the multiplier 44 is input removes the component with a doubled frequency and outputs only the DC component.

An output signal of the low-pass filter 45 is output to the load resistor 46. In the first embodiment, a signal applied to the load resistor 46 is an identification output signal or a measurement output signal. The measurement output signal is a signal which is output from the second exposed end portions 822 when estimating the respective coupling capacitances $C_{px}$ between the numerous input electrodes 242 and the numerous first exposed end portions 821 facing each other and the respective coupling capacitances $C_{qx}$ between the numerous output electrodes 412 and the numerous second exposed end portions 822 facing each other. The identification output signal is a signal which is output from the second exposed end portions 822 when identifying the correspondence relations between the numerous first exposed end portions 821 and the numerous second exposed end portions 822. Information about a voltage value of the identification output signal or the measurement output signal (a potential difference between both ends of the load resistor 46) output from the load resistor 46 is sent to the control device 6.

(Reference Signal Generating Circuit 5)

The reference signal generating circuit 5 includes a reference phase shifter 51 and a reference amplifier 52. The reference phase shifter 51 is connected to the voltage source 21 so as to be parallel to the main amplifier 22 and the auxiliary input circuit 3. The reference phase shifter 51 adjusts the phase of the output voltage of the voltage source 21. The reference amplifier 52 amplifies an output of the reference phase shifter 51 and generates a reference signal $v_{ref}$. The reference signal $v_{ref}$ output from the reference amplifier 52 is input to the multiplier 44. That is, taking into account coupling capacitances between the electrodes (the input electrodes 242 and the output electrodes 412) and the insulated wires 82 facing each other and a phase shift during transmission of the signal through the multicore cable 8, the reference signal generating circuit 5 generates the reference signal $v_{ref}$ so that the reference signal $v_{ref}$ output from the reference amplifier 52 has the same phase as the signals output from the output electrodes 412 and input to the multiplier 44.

(Control Device 6)

The control device 6 includes a control unit 61 including a CPU (an arithmetic processing unit) and a RAM serving as a calculation area during CPU operation, and a storage unit 62 having a ROM, a hard disc, etc. The control unit 61 includes a first measurement unit 611, an estimation unit 612, a second measurement unit 613, a corresponding-end identifying unit 614 and a misdetection determination unit 615. The CPU executes a program stored in the storage unit 62 and the control unit 61 thereby realizes respective functions of the first measurement unit 611, the estimation unit 612, the second measurement unit 613, the corresponding-end identifying unit 614 and the misdetection determination unit 615.

The first measurement unit 611 controls the ON/OFF state of the numerous main input switch devices 23 and the numerous output switch devices 42, inputs the measurement input signal as the main output signal V+ by capacitive coupling to the first exposed end portion 821 from a predetermined input electrode 242 among the numerous input electrodes 242, causes the measurement output signal to be output by capacitive coupling from a predetermined second exposed end portion 822 among the numerous second exposed end portions 822 through the output electrode 412, and measures a voltage value of the measurement output signal. The first measurement unit 611 performs the measurement of the voltage value of the measurement output signal described above, with plural predetermined different combinations of the input electrodes 242 to input the measurement input signal and the output electrodes 412 to output the measurement output signal. The plural predetermined combinations will be described later. The measurement of the measurement output signal by the first measurement unit 611 is performed in a state in which all the auxiliary switch devices 33 are in the OFF state.

Based on the measured voltage values of the plural measurement output signals, the estimation unit 612 estimates the respective coupling capacitances $C_{px}$ between the numerous input electrodes 242 and the numerous first exposed end portions 821 facing each other and the respective coupling capacitances $C_{qx}$ between the numerous output electrodes 412 and the numerous second exposed end portions 822 facing each other. The theory of estimation of various coupling capacitances by the estimation unit 612 will be described later.

The second measurement unit 613 controls the ON/OFF state of each of the numerous main input switch devices 23 and the numerous auxiliary switch devices 33, inputs the identification input signal as the main output signal V+ to the first exposed end portion 821 subjected to identification of the correspondence relation (hereinafter, referred to as an input-side identification target) among the first exposed end portions 821, and inputs the auxiliary signal V− to another first exposed end portion 821. At the same time, the second measurement unit 613 controls the ON/OFF state of the numerous output switches to cause the identification output signal to be output by capacitive coupling from the second exposed end portion 822 subjected to identification of the correspondence relation (hereinafter, referred to as an output-side identification target) among the numerous second exposed end portions 822 through the output electrode 412, and measures a voltage value of the identification output signal. The second measurement unit 613 performs the measurement of the voltage value of the identification output signal by sequentially changing the second exposed end portion 822 to output the identification output signal while keeping the first exposed end portion 821 receiving an input of the identification input signal and another first exposed end portion 821 receiving an input of the auxiliary signal V− unchanged, until the identification output signal is output through all the second exposed end portions 822. Furthermore, the second measurement unit 613 repeats the measurement of the voltage value of the identification output signal described above by changing the first exposed end portion 821 receiving an input of the identification input signal while keeping the first exposed end portion 821 receiving an input of the auxiliary signal V− unchanged, until each of the numerous first exposed end portions 821 becomes the input-side identification target.

The corresponding-end identifying unit 614 identifies the correspondence relations between the numerous first exposed end portions 821 and the numerous second exposed end portions 822. The corresponding-end identifying unit 614 calculates a correction voltage value by multiplying the voltage value of each identification output signal, which is measured by the second measurement unit 613, by a correction coefficient. The details of the method for calculating the correction voltage value will be described later. By the corresponding-end identifying unit 614, the largest correction voltage value among the correction voltage values calculated based on the identification output signals respectively output from all the second exposed end portions 822 is identified for one first exposed end portion 821 as the input-side identification target. Then, the corresponding-end identifying unit 614 determines that the second exposed end portion 822 outputting the identification output signal from which such a largest correction voltage value was calculated is the second exposed end portion 822 corresponding to the first exposed end portion 821 as the input-side identification target. The corresponding-end identifying unit 614 performs such identification for all the first exposed end portions 821, identifies all the correspondence relations between the numerous first exposed end portions 821 and the numerous second exposed end portions 822, and stores all the correspondence relations in the storage unit 62. The correspondence relations between the numerous first exposed end portions 821 and the numerous second exposed end portions 822 are stored in the storage unit 62 based on, e.g., the numbers sequentially assigned to the numerous first exposed end portions 821 arranged in a row on the input board 24 and the numbers sequentially assigned to the numerous second exposed end portions 822 arranged in a row on the output board 41.

The misdetection determination unit 615 determines whether or not there is any error in the identification results for the correspondence relations between the numerous first exposed end portions 821 and the numerous second exposed end portions 822. The misdetection determination unit 615 refers to the correspondence relations between the first exposed end portions 821 and the second exposed end portions 822 stored in the storage unit 62, and when it is identified that plural first exposed end portions 821 correspond to the same second exposed end portion 822, the misdetection determination unit 615 determines that there is misdetection. Then, when the misdetection determination unit 615 determines that there is misdetection in identification of the correspondence relations between the numerous first exposed end portions 821 and the numerous second exposed end portions 822, only the wrongly detected first exposed end portions 821 are reidentified by the corresponding-end identifying unit 614 to find the corresponding second exposed end portions 822. At this time, the auxiliary signal V− is input to the first exposed end portion 821 which is different from the first exposed end portion 821 to which the auxiliary signal V− was input at the time the correspondence relations between the numerous first exposed end portions 821 and the numerous second exposed end portions 822 was identified the last time by using the corresponding-end identifying unit 614. This is repeated until no more misdetection is found.

(Theory about the Process Performed by the Estimation Unit 612)

Next described is the theory underlying the process performed by the estimation unit 612 to estimate the respective coupling capacitances $C_{px}$ between the numerous input electrodes 242 and the numerous first exposed end portions 821 facing each other and the respective coupling capacitances $C_{qx}$ between the numerous output electrodes 412 and the numerous second exposed end portions 822 facing each other.

Figure 10:
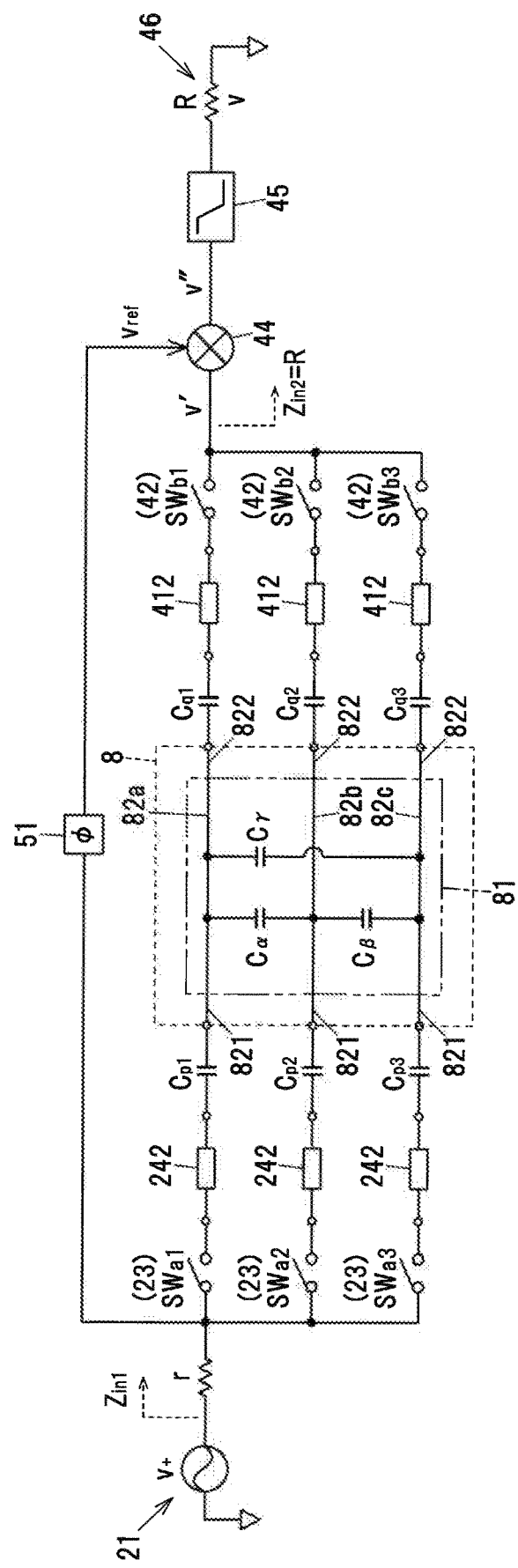
FIG. 10 is an equivalent circuit diagram illustrating a simplified model for calculating a theoretical value of a voltage value of a measurement output signal measured by a first measurement unit in the first embodiment.

FIG. 10 is an equivalent circuit diagram illustrating a simplified model for calculating a theoretical value of a voltage value v of the measurement output signal measured by the first measurement unit 611. Hereinafter, for the purpose of convenience, three insulated wires 82 shown in FIG. 10 are referred to as a first insulated wire 82a, a second insulated wire 82b and a third insulated wire 82c sequentially from the top of the paper of FIG. 10. In addition, the main input switch device 23 electrically connected to the input electrode 242 facing the first insulated wire 82a is referred to as a main input switch device $SW_{a1}$, and the output switch device 42 electrically connected to the output electrode 412 facing the first insulated wire 82a is referred to as an output switch device $SW_{b1}$. In addition, the main input switch device 23 electrically connected to the input electrode 242 facing the second insulated wire 82b is referred to as a main input switch device $SW_{a2}$, and the output switch device 42 electrically connected to the output electrode 412 facing the second insulated wire 82b is referred to as an output switch device $SW_{b2}$. Furthermore, the main input switch device 23 electrically connected to the input electrode 242 facing the third insulated wire 82c is referred to as a main input switch device $SW_{a3}$, and the output switch device 42 electrically connected to the output electrode 412 facing the third insulated wire 82c is referred to as an output switch device $SW_{b3}$. Since the method for calculating the voltage value of the measurement output signal measured by the first measurement unit 611 for the insulated wires other than the insulated wires 82 shown in FIG. 10 is the same as the method for calculating the voltage value of the measurement output signal output from the third insulated wire 82c, only the three insulated wires 82a, 82b, 82c out of the numerous insulated wires 82 are shown in FIG. 10.

In addition, in FIG. 10, a coupling capacitance between the first exposed end portion 821 of the first insulated wire 82a and the input electrode 242 is defined as $C_{p1}$, a coupling capacitance between the first exposed end portion 821 of the second insulated wire 82b and the input electrode 242 is defined as $C_{p2}$, and a coupling capacitance between the first exposed end portion 821 of the third insulated wire 82c and the input electrode 242 is defined as $C_{p3}$. In addition, a coupling capacitance between the second exposed end portion 822 of the first insulated wire 82a and the output electrode 412 is defined as $C_{q1}$, a coupling capacitance between the second exposed end portion 822 of the second insulated wire 82b and the output electrode 412 is defined as $C_{q2}$, and a coupling capacitance between the second exposed end portion 822 of the third insulated wire 82c and the output electrode 412 is defined as $C_{q3}$. Furthermore, a coupling capacitance between the first insulated wire 82a and the second insulated wire 82b is defined as $C_\alpha$, a coupling capacitance between the second insulated wire 82b and the third insulated wire 82c is defined as $C_\beta$, and a coupling capacitance between the first insulated wire 82a and the third insulated wire 82c is defined as $C_\gamma$. In addition, $Z_{in1}$ indicates an input impedance when viewing the output side from the voltage source 21, and $Z_{in2}$ indicates an input impedance when viewing the output side from the output switch device 42.

In the first embodiment, voltage of the measurement input signal is defined as $V+=v_0 \exp(j\omega t)$, where $v_0$ indicates amplitude of the voltage, j indicates an imaginary unit, $\omega$ indicates an angular frequency, and t indicates time. In addition, in FIG. 10, voltage of the signal output from the output electrode 412 when the measurement input signal is input to a predetermined insulated wire 82 is indicated by v', voltage of the signal output from the multiplier 44 is indicated by v", and voltage of the signal output from the low-pass filter 45, i.e., the measurement output signal, is indicated by v.

Firstly, voltage of the measurement output signal when measured with the following five different combinations (i) to (v) of the input electrode 242 to input the measurement input signal and the output electrode 412 to output the measurement output signal, and an average $v_{a1-m0-ave}$ shown in (vi) below, are respectively calculated.

(i) Voltage $v_{a1-m0-b1}$ of the measurement output signal when the main input switch device $SW_{a1}$ and the output switch device $SW_{b1}$ are in the ON state and all other switch devices are in the OFF state.

(ii) Voltage $v_{a2-m0-b1}$ of the measurement output signal when the main input switch device $SW_{a2}$ and the output switch device $SW_{b2}$ are in the ON state and all other switch devices are in the OFF state.

(iii) Voltage $v_{a1,a2-m0-b1}$ of the measurement output signal when the main input switch devices $SW_{a1}$, $SW_{a2}$ and the output switch device $SW_{b1}$ are in the ON state and all other switch devices are in the OFF state.

(iv) Voltage $v_{a1-m0-b2}$ of the measurement output signal when the main input switch device $SW_{a1}$ and the output switch device $SW_{b2}$ are in the ON state and all other switch devices are in the OFF state.

(v) Voltage $v_{a1-m0-b3}$ of the measurement output signal when the main input switch device $SW_{a1}$ and the output switch device $SW_{b3}$ are in the ON state and all other switch devices are in the OFF state.

(vi) Average $v_{a1-m0-ave}$ of the voltage $v_{a1-m0-b1}$, the voltage $v_{a1-m0-b2}$, and the voltage $v_{a1-m0-b3}$.

Firstly, the theoretical value of the voltage $v_{a1-m0-b1}$ of the measurement output signal in case of (i) is calculated.

The input impedance $Z_{in1}$ in FIG. 10 can be calculated by AC theory as follows.

$$Z_{in1} = r + \frac{1}{j\omega C_{p1}} + \frac{1}{j\omega C_{q1}} + R = \left\{(r+R)^2 + \frac{1}{\omega^2}\left(\frac{1}{C_{p1}} + \frac{1}{C_{q1}}\right)^2\right\}^{\frac{1}{2}} Re^{j\theta_1} \quad (1)$$

$$\theta_1 \equiv \arctan\left\{-\frac{1}{(r+R)\omega}\left(\frac{1}{C_{p1}} + \frac{1}{C_{q1}}\right)\right\}$$

Here, it is assumed that the inequality relationship of the formula (2) below holds for the angular frequency $\omega$, each coupling capacitance, and resistance values r, R. In the formula (2) below, the symbol $C_a$ is any one of the coupling capacitances $C_{p1}$, $C_{p2}$, $C_{p3}$, $C_{q1}$, $C_{q2}$, $C_{q3}$, the symbol $C_b$ is any one of the coupling capacitances $C_\alpha$, $C_\beta$, $C_\gamma$, and the symbol $R_a$ is any one of the resistance values r, R.

$$\frac{1}{\omega C_a} \gg \frac{1}{\omega C_b} \gg R_a \quad (2)$$

If the formula (2) holds true, then the formula (3) below holds true.

$$r + R \ll \frac{1}{\omega}\left(\frac{1}{C_{p1}} + \frac{1}{C_{q1}}\right) \quad (3)$$

Using the formula (3), the formula (1) can be approximated as in the formula (4) below.

$$Z_{in1} \approx \frac{1}{\omega}\left(\frac{1}{C_{p1}} + \frac{1}{C_{q1}}\right)e^{-j\frac{\pi}{2}} \quad (4)$$

Then, as shown in FIG. 10, the signal output from the output electrode 412 and the reference signal $v_{ref}$ are multiplied with each other by the multiplier 44. The reference signal $v_{ref}$ here is defined as the next formula (5).

$$v_{ref} = v_r \cdot e^{j(\omega t + \frac{\pi}{2})} \quad (5)$$

Meanwhile, voltage $v'_{a1-m0-b1}$ of the signal output from the output electrode 412 is obtained as in the next formula (6).

$$v'_{a1-m0-b1} = \frac{R}{Z_{in1}}V_4 \approx \frac{R}{\frac{1}{\omega}\left(\frac{1}{C_{p1}} + \frac{1}{C_{q1}}\right)}v_0 \cdot e^{j(\omega t + \frac{\pi}{2})} \quad (6)$$

At this time, voltage $v''_{a1-m0-b1}$ of the signal output from the multiplier 44 is obtained as in the next formula (7). u[−] defined in the formula below is nondimensionalized by dividing $v_r[V]$ by $1[V]$.

$$u[-] \equiv \frac{v_r[V]}{1[V]}$$

$$v''_{a1-m0-b1} \approx \frac{R}{\frac{1}{\omega}\left(\frac{1}{C_{p1}} + \frac{1}{C_{q1}}\right)}v_0\cos\left(\omega t + \frac{\pi}{2}\right) \cdot u \cdot \cos\left(\omega t + \frac{\pi}{2}\right) = \quad (7)$$

$$\frac{R}{\frac{1}{\omega}\left(\frac{1}{C_{p1}} + \frac{1}{C_{q1}}\right)}v_0 \cdot u \frac{\cos(2\omega t + \pi) + 1}{2}$$

Then, by leaving only the DC component in the formula (7), the voltage $v_{a1-m0-b1}$ of the measurement output signal output from the low-pass filter 45 is obtained as in the following formula (8).

$$v_{a1-m0-b1} \approx \frac{R}{2\left(\frac{1}{C_{p1}} + \frac{1}{C_{q1}}\right)} v_0 \cdot u = \frac{A}{\frac{1}{C_{p1}} + \frac{1}{C_{q1}}} \equiv \alpha \quad (8)$$

$$A \equiv \frac{R}{2} v_0 u$$

The formulas (9) to (13) below are the results when the theoretical values of the voltage values of the measurement output signal in the cases of (ii) to (vi) described above are calculated in the same manner. Cqr in the formula (13) below is a coupling capacitance between the second exposed end portion 822 and the output electrode 412 when the voltage of the measurement output signal is the average $v_{a1-m0-ave}$.

$$v_{a2-m0-b1} \approx \frac{A}{\frac{1}{C_{p2}} + \frac{1}{C_{q1}}} \equiv \beta \quad (9)$$

$$v_{a1,a2-m0-b1} \approx \frac{A}{\frac{1}{C_{p1}+C_{p2}} + \frac{1}{C_{q1}}} \equiv \gamma \quad (10)$$

$$v_{a1-m0-b2} \approx \frac{A}{\frac{1}{C_{p1}} + \frac{1}{C_{p2}}} \equiv \delta \quad (11)$$

$$v_{a1-m0-b3} \approx \frac{A}{\frac{1}{C_{p1}} + \frac{1}{C_{q3}}} \equiv \epsilon \quad (12)$$

$$v_{a1-m0-ave} \approx \frac{A}{\frac{1}{C_{p1}} + \frac{1}{C_{qr}}} \equiv \theta \quad (13)$$

Then, by solving the six simultaneous equations of the formulas (8) to (13), six coupling capacitances $C_{p1}$, $C_{p2}$, $C_{q1}$, $C_{q2}$, $C_{q3}$, $C_{qr}$ are obtained as in the formulas (14) to (19).

$$C_{p1} \approx \frac{1}{A\left\{\frac{-\alpha-\beta+\gamma}{\alpha\beta \pm \sqrt{\alpha\beta(\alpha-\gamma)(\beta-\gamma)}} + \frac{1}{\alpha}\right\}} \quad (14)$$

$$C_{p2} \approx \frac{1}{A\left\{\frac{-\alpha-\beta+\gamma}{\alpha\beta \pm \sqrt{\alpha\beta(\alpha-\gamma)(\beta-\gamma)}} + \frac{1}{\beta}\right\}} \quad (15)$$

$$C_{q1} \approx \frac{\alpha\beta \pm \sqrt{\alpha\beta(\alpha-\gamma)(\beta-\gamma)}}{A(\alpha+\beta-\gamma)} \quad (16)$$

$$C_{q2} \approx \frac{1}{A\left\{\frac{\alpha+\beta-\gamma}{\alpha\beta \pm \sqrt{\alpha\beta(\alpha-\gamma)(\beta-\gamma)}} - \frac{1}{\alpha} + \frac{1}{\delta}\right\}} \quad (17)$$

$$C_{q3} \approx \frac{1}{A\left\{\frac{\alpha+\beta-\gamma}{\alpha\beta \pm \sqrt{\alpha\beta(\alpha-\gamma)(\beta-\gamma)}} - \frac{1}{\alpha} + \frac{1}{c}\right\}} \quad (18)$$

$$C_{qr} \approx \frac{1}{A\left\{\frac{\alpha+\beta-\gamma}{\alpha\beta \pm \sqrt{\alpha\beta(\alpha-\gamma)(\beta-\gamma)}} - \frac{1}{\alpha} + \frac{1}{\theta}\right\}} \quad (19)$$

From the theory described above, the respective coupling capacitances can be expressed by the voltages $v_{a1-m0-b1}$, $v_{a2-m0-b1}$, $v_{a1,a2-m0-b1}$, $v_{a1-m0-b2}$, $v_{a1-m0-b3}$ of the measurement output signal and the average $v_{a1-m0-ave}$, i.e., expressed by the values actually measured by the first measurement unit 611, as in the formulas (14) to (19). Thus, by actually measuring the voltages $v_{a1-m0-b1}$, $v_{a2-m0-b1}$, $v_{a1,a2-m0-b1}$, $v_{a1-m0-b2}$, $v_{a1-m0-b3}$ of the measurement output signal in advance and calculating the average $v_{a1-m0-ave}$, the respective coupling capacitances can be estimated using the formulas (14) to (19).

On the assumption that the insulated wire 82 receiving an input of the measurement input signal is changed sequentially, the respective coupling capacitances between the numerous first exposed end portions 821 and the numerous input electrodes 242, except the coupling capacitances calculated by the formula (14) and the formula (15), can be calculated by applying the same theory as that for the calculation method of the formula (14) and the formula (15).

Here, accuracy of the formulas (14) to (19) is checked by comparing with simulation results. Various parameters used for the simulation are summarized in Table 1.

TABLE 1

| Constant | Value |
|---|---|
| r[Ω] | 50 |
| R[Ω] | 50 |
| $v_0$[V] | 1 |
| u[−] | 1 |
| ω[Hz] | 3.0E+06 |
| $C_\alpha$[F] | 180E−12 |
| $C_\beta$[F] | 140E−12 |
| $C_\gamma$[F] | 160E−12 |

The simulation results are shown in Table 2 below. In Table 2 below, estimated values 1 are the results when "±" in the formulas (14) to (19) are all "+", and estimated values 2 are the results when "±" in the formulas (14) to (19) are all "−".

TABLE 2

| Coupling capacitance | Estimated value 1 [F] | Estimated value 2 [F] | Measured value [F] | Estimation error [%] of Estimated value 1 |
|---|---|---|---|---|
| Cp1 | 2.9E−12 | ∞ | 3.0E−12 | 4.6 |
| Cp2 | 2.9E−12 | ∞ | 3.0E−12 | 4.6 |
| Cq1 | 9.8E−14 | 9.5E−14 | 1.0E−13 | 2.1 |
| Cq2 | 9.8E−13 | 7.3E−13 | 1.0E−12 | 1.6 |
| Cq3 | 3.0E−12 | 1.5E−12 | 3.0E−12 | 1.5 |
| Cqr | 1.0E−12 | 7.6E−13 | — | — |

The estimated values 1 obtained when "±" in the formulas (14) to (19) are all "+" takes different values from the estimated values 2 obtained when "±" are all "−", as shown in Table 2. To select which of the estimated values 1 and the estimate values 2 are used, for example, numerical ranges within which coupling capacitances respectively fall are predicted in advance, and the estimated values of the coupling capacitances all falling within such numerical ranges (in this example, the estimated values 1) are selected as the estimated values to be used. Regarding how the ranges within which the coupling capacitances respectively fall are predicted in advance, the ranges can be estimated in advance by taking into account, e.g., a thickness of the covering 826 of the insulated wire 82, relative permittivity of the covering 826, an area of the electrode (a product of length and width), and a distance between the electrode and the insulated wire 82, etc. Then, regarding the estimated values 1, an error from the measured value is not more than 4.6% as understood from Table 2 and each coupling capacitance is estimated with high accuracy.

(Theory about the Process Performed by the Corresponding-End Identifying Unit 614)

Next described is the theory underlying the process performed by the corresponding-end identifying unit 614 to identify the correspondence relations between the numerous first exposed end portions 821 and the numerous second exposed end portions 822.

Figure 11:
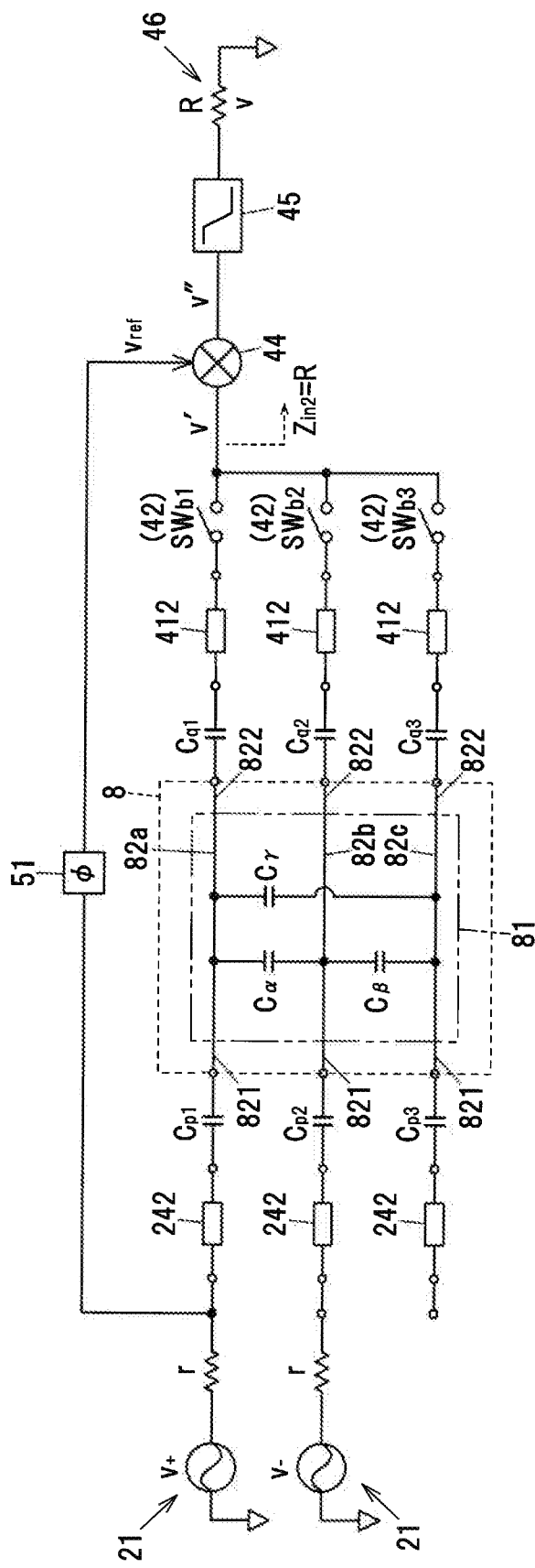
FIG. 11 is an equivalent circuit diagram illustrating a simplified model for calculating a theoretical value of a voltage value of an identification output signal measured by a second measurement unit in the first embodiment.

FIG. 11 is an equivalent circuit diagram illustrating a simplified model for calculating a theoretical value of the voltage value of the identification output signal measured by the second measurement unit 613. Three insulated wires shown in FIG. 11 are the first insulated wire 82*a*, the second insulated wire 82*b* and the third insulated wire 82*c* shown in FIG. 10. The identification input signal is input to the first insulated wire 82*a*, the auxiliary signal V− is input to the second insulated wire 82*b*, and no signal is input to the third insulated wire 82*c*. Since the method for calculating the voltage value of the identification output signal measured by the second measurement unit 613 for the insulated wires 82 other than the insulated wires 82 shown in FIG. 11 is the same as the method for calculating the voltage value of the identification output signal output from the third insulated wire 82*c*, only the three insulated wires 82 out of the numerous insulated wires 82 are shown in FIG. 11.

Voltage of the auxiliary signal V− in FIG. 11 is defined as V−=$v_0$ exp{j($\omega$t+$\pi$)}. In addition, in FIG. 11, voltage of the signal output from the output electrode 412 when the identification input signal is input to the first insulated wire 82*a* and the auxiliary signal V− to the second insulated wire 82*b* is indicated by v', voltage of the signal output from the multiplier 44 is indicated by v", and voltage of the signal output from the low-pass filter 45, i.e., the identification output signal, is indicated by v. The other reference signs shown in FIG. 11 are the same as those in FIG. 10.

Here, the voltage values of the identification output signals, which are output by capacitive coupling from the respective second exposed end portions 822 of the first insulated wire 82*a*, the second insulated wire 82*b* and the third insulated wire 82*c* through the output electrodes 412 when the identification input signal is input to the first exposed end portion 821 of the first insulated wire 82*a* and the auxiliary signal V− to the first exposed end portion 821 of the second insulated wire 82*b*, are theoretically calculated.

Figure 12:
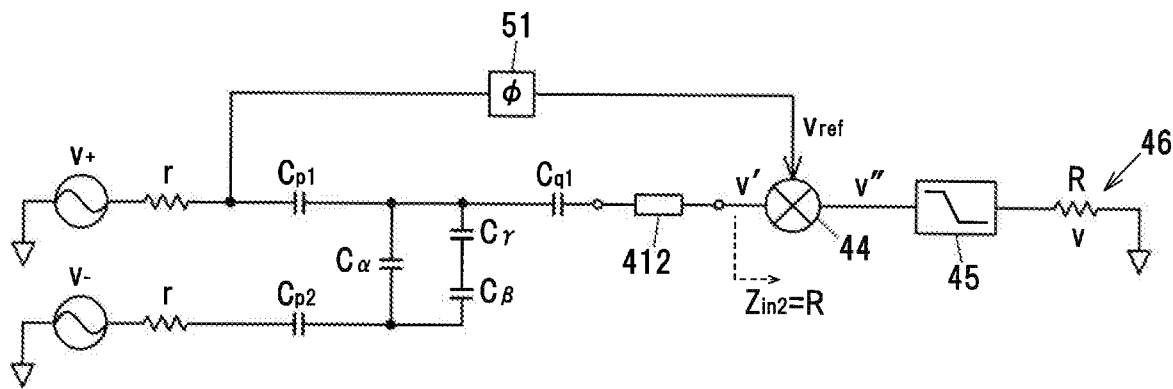
FIG. 12 is an equivalent circuit diagram illustrating a simplified model for calculating a voltage $v_{a1\text{-}m2\text{-}b1}$ in the first embodiment.

Firstly, voltage $v_{a1-m2-b1}$ is calculated which is voltage of the identification output signal that is output when the identification input signal is input to the first insulated wire 82*a* and the auxiliary signal V− to the second insulated wire 82*b* and only the output switch device SW$_{b1}$ among the numerous output switch devices 42 is in the ON state. The equivalent circuit at this time is expressed as shown in FIG. 12. In this regard, in the state shown in FIG. 12, the main input switch device connected to the input electrode 242 facing the first insulated wire 82*a*, the auxiliary switch device connected to the input electrode 242 facing the second insulated wire 82*b* and the output switch device SW$_{b1}$, which are shown in FIG. 11, are in the ON state, and the main input switch devices, the auxiliary switch devices and the output switch devices other than these three switch devices are in OFF state.

From the equivalent circuit in FIG. 12 and using the AC theory, voltage $v'_{a1-m2-b1}$ of the signal output from the output electrode 412 is calculated as in the formula (20) below. The symbol $C_\delta$ in the formula (20) below is $C_\delta \equiv C_\alpha + \{(C_\beta C_\gamma)/(C_\beta + C_\gamma)\}$. In addition, the symbol "//" in the formula (20) below indicates an impedance of parallel connection and is, e.g., A//B=(A×B)/(A+B).

$$v'_{a1-m2-b1} = \qquad (20)$$

$$v_+ \cdot \frac{\left(\frac{1}{j\omega C_{q1}} + R\right) // \left(\frac{1}{j\omega C_\delta} + \frac{1}{j\omega C_{p2}} + r\right)}{r + \frac{1}{j\omega C_{p1}} + \left(\frac{1}{j\omega C_{q1}} + R\right) // \left(\frac{1}{j\omega C_\delta} + \frac{1}{j\omega C_{p2}} + r\right)} \cdot \frac{R}{\frac{1}{j\omega C_{q1}} + R} +$$

$$v_- \cdot \frac{\left(\frac{1}{j\omega C_{p1}} + r\right) // \left(\frac{1}{j\omega C_{q1}} + R\right)}{r + \frac{1}{j\omega C_{p2}} + \frac{1}{j\omega C_\delta} + \left(\frac{1}{j\omega C_{p1}} + r\right) // \left(\frac{1}{j\omega C_{q1}} + R\right)} \cdot \frac{R}{\frac{1}{j\omega C_{q1}} + R}$$

Here, a relational expression to make it easy to use the formula (20) (i.e., the formula (23) described later) is derived. Firstly, the formula (21) is obtained. As described previously, the symbol $C_a$ is any one of the coupling capacitances $C_{p1}$, $C_{p2}$, $C_{p3}$, $C_{q1}$, $C_{q2}$, $C_{q3}$, the symbol $C_b$ is any one of the coupling capacitances $C_\alpha$, $C_\beta$, $C_\gamma$, and the symbol $R_a$ is any one of the resistance values r, R. The formula (2) described above is used for formula transformation from the first line to the second line in the formula (21) below.

$$\frac{1}{j\omega C_a} + \frac{1}{j\omega C_b} + R_a = \qquad (21)$$

$$\left(\left(\frac{1}{\omega C_a} + \frac{1}{\omega C_b}\right)^2 + R_a^2\right)^{\frac{1}{2}} e^{j\theta} \; \theta = \arctan\left(-\frac{\frac{1}{\omega C_a} + \frac{1}{\omega C_b}}{R_a}\right) \approx$$

$$\frac{1}{\omega}\left(\frac{1}{C_a}\left(\frac{1}{C_a} + \frac{1}{C_b}\right)\right)^{\frac{1}{2}} e^{j(-\frac{\pi}{3})} = \frac{1}{j\omega\left\{\frac{1}{C_a}\left(\frac{1}{C_a} + \frac{2}{C_b}\right)\right\}^{\frac{1}{2}}}$$

Here, when applying Newton's generalized binomial theorem, the denominator $\{(1/C_a)+(2/C_b)\}^{1/2}$ of the formula (21) can be transformed into the formula (22) below. In this regard, approximation taking into account $(1/C_a)>(1/C_b)$ is used for formula transformation from the second line to the third line in the formula (22) below.

$$\left(\frac{1}{C_a} + \frac{2}{C_b}\right)^{-\frac{1}{2}} = \sum_{k=0}^{\infty}\binom{-\frac{1}{2}}{k}\left(\frac{1}{C_a}\right)^{-\frac{1}{2}-k}\left(\frac{2}{C_b}\right)^k = \qquad (22)$$

$$C_a^{\frac{1}{2}}\left\{1 - C_a C_b^{-1} + \frac{3}{2}(C_a C_b^{-1})^2 + \cdots \right\} \approx C_a^{\frac{1}{2}}\left(1 - \frac{C_a}{C_b}\right)$$

A relational expression expressed by the formula (23) below is obtained from the formula (21) and the formula (22).

$$\frac{1}{j\omega C_a} + \frac{1}{j\omega C_b} + R_a \approx \frac{1}{j\omega C_a\left(1 - \frac{C_a}{C_b}\right)} \qquad (23)$$

Using the derived formula (23), the formula (20) can be rearranged into the formula (24) below. In this regard, in applying the equation (23), $C_\delta$ is also included in $C_b$. In addition, approximation based on the formula (2) is used from the first line to the second line in the formula (24).

$$v'_{a1-m2-b2} \approx \qquad (24)$$

$$v_0 \omega R C_{q1} \frac{C_{p1} - C_{p2}\left\{1 - \frac{C_{p2}(C_\beta + C_\gamma)}{C_\alpha C_\beta + C_\beta C_\gamma + C_\gamma C_\alpha}\right\}}{C_{p1} + C_{q1} + C_{p2}\left\{1 - \frac{C_{p2}(C_\beta + C_\gamma)}{C_\alpha C_\beta + C_\beta C_\gamma + C_\gamma C_\alpha}\right\}} e^{j(\omega t + \frac{\pi}{2})} \approx$$

$$v_0 \omega R \frac{C_{p1} - C_{p2}\left\{1 - \frac{C_{p2}(C_\beta + C_\gamma)}{C_\alpha C_\beta + C_\beta C_\gamma + C_\gamma C_\alpha}\right\}}{\frac{C_{p1} + C_{p2}}{C_{q1}} + 1} e^{j(\omega t + \frac{\pi}{2})} = v_1 e^{j(\omega t + \frac{\pi}{2})}$$

$$v_1 \equiv v_0 \omega R \frac{C_{p1} - C_{p2}\left\{1 - \frac{C_{p2}(C_\beta + C_\gamma)}{C_\alpha C_\beta + C_\beta C_\gamma + C_\gamma C_\alpha}\right\}}{\frac{C_{p1} + C_{p2}}{C_{q1}} + 1} \qquad (25)$$

Then, as shown in FIG. 12, the signal output from the output electrode 412 and the reference signal $v_{ref}$ are multiplied with each other by the multiplier 44. At this time, using the formula (24) and the formula (5) expressing the voltage of the reference signal $v_{ref}$, voltage $v''_{a1-m2-b1}$ of the signal output from the multiplier 44 can be rearranged into the formula (26) below.

$$v''_{a1-m2-b1} \approx v_1 \cos\left(\omega t + \frac{\pi}{2}\right) \cdot u \cdot \cos\left(\omega t + \frac{\pi}{2}\right) = \frac{v_1 u}{2}\{\cos(2\omega t + \pi) + 1\} \qquad (26)$$

Then, by leaving only the DC component in the formula (26) and returning $V_1$ defined by the formula (25) to the formula (26), the voltage $v_{a1-m2-b1}$ of the identification output signal output from the low-pass filter 45 can be expressed as the next formula (27). $v_{a1-m2-b1}$ in the formula (27) below is voltage of the identification output signal when only the output switch device $SW_{b1}$ among the numerous output switch devices 42 is in the ON state.

$$v_{a1-m2-b1} \approx \frac{1}{2} v_0 u \omega R \frac{C_{p1} - C_{p2}\left\{1 - \frac{C_{p2}(C_\beta + C_\gamma)}{C_\alpha C_\beta + C_\beta C_\gamma + C_\gamma C_\alpha}\right\}}{\frac{C_{p1} + C_{p2}}{C_{q1}} + 1} \qquad (27)$$

Next, voltage $v_{a1-m2-b2}$ is calculated which is voltage of the identification output signal that is output when the identification input signal is input to the first insulated wire 82a and the auxiliary signal V− to the second insulated wire 82b and only the output switch device $SW_{b2}$ among the numerous output switch devices 42 is in the ON state. Using the same logic as when calculating the voltage $v_{a1-m2-b1}$ of the identification output signal expressed by the formula (27), the voltage $v_{a1-m2-b2}$ of the identification output signal is obtained as in the formula (28) below.

$$v_{a1-m2-b2} \approx \frac{1}{2} v_0 u \omega R \frac{C_{p2} - C_{p1}\left\{1 - \frac{C_{p1}(C_\beta + C_\gamma)}{C_\alpha C_\beta + C_\beta C_\gamma + C_\gamma C_\alpha}\right\}}{\frac{C_{p1} + C_{p2}}{C_{q2}} + 1} \qquad (28)$$

Figure 13:
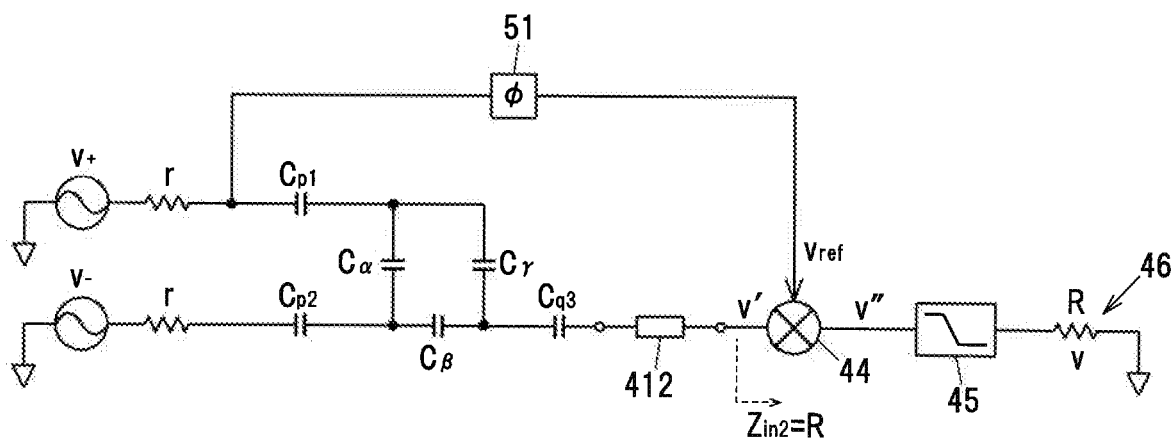
FIG. 13 is an equivalent circuit diagram illustrating a simplified model for calculating a voltage $v_{a1\text{-}m2\text{-}b3}$ in the first embodiment.

Next, voltage $v_{a1-m2-b3}$ is calculated which is voltage of the identification output signal that is output when the identification input signal is input to the first insulated wire 82a and the auxiliary signal V− to the second insulated wire 82b and only the output switch device $SW_{b3}$ among the numerous output switch devices 42 is in the ON state. The equivalent circuit at this time is as shown in FIG. 13, but to simplify the calculation, it is converted into an equivalent circuit shown in FIG. 14 by performing a Δ-Y transformation of the connection points of the three coupling capacitances $C_\alpha$, $C_\beta$, $C_\gamma$. The coupling capacitances after the Δ-Y transformation are defined as $C_x$, $C_y$, $C_z$. From the equivalent circuit in FIG. 14 and using the AC theory, voltage $v'_{a1-m2-b3}$ of the signal output from the output electrode 412 is calculated as in the formula (29) below.

$$v'_{a1-m2-b3} = v_1 \times \frac{\left(\frac{1}{j\omega C_y} + \frac{1}{j\omega C_{p2}} + r\right) // \left(\frac{1}{j\omega C_z} + \frac{1}{j\omega C_{q3}} + R\right)}{r + \frac{1}{j\omega C_{p1}} + \frac{1}{j\omega C_z} + \left(\frac{1}{j\omega C_y} + \frac{1}{j\omega C_{p2}} + r\right) // \left(\frac{1}{j\omega C_z} + \frac{1}{j\omega C_{q3}} + R\right)} \times \qquad (29)$$

$$\frac{R}{\frac{1}{j\omega C_z} + \frac{1}{j\omega C_{q3}} + R} + v_{..} \times$$

$$\frac{\left(\frac{1}{j\omega C_x} + \frac{1}{j\omega C_{p1}} + r\right) // \left(\frac{1}{j\omega C_z} + \frac{1}{j\omega C_{q3}} + R\right)}{r + \frac{1}{j\omega C_{p2}} + \frac{1}{j\omega C_y} + \left(\frac{1}{j\omega C_x} + \frac{1}{j\omega C_{p1}} + r\right) // \left(\frac{1}{j\omega C_z} + \frac{1}{j\omega C_{q3}} + R\right)} \times \frac{R}{\frac{1}{j\omega C_z} + \frac{1}{j\omega C_{q3}} + R}$$

Here, the formula (29) can be approximated as in the formula (30) below when using the relational expression expressed by the formula (23) for formula transformation and returning $C_x$, $C_y$, $C_z$ to the formula using $C_\alpha$, $C_\beta$, $C_\gamma$.

$$v'_{a1-m2-b3} \approx v_0 \omega R C_{q3} \left(1 - \frac{C_{q3} C_\alpha}{C_\alpha C_\beta + C_\beta C_\gamma + C_\gamma C_\alpha}\right) \times \qquad (30)$$

$$\frac{\left(C_{p1}\left(1 - \frac{C_{p1} C_\beta}{C_\alpha C_\beta + C_\beta C_\gamma + C_\gamma C_\alpha}\right) - C_{p2}\left(1 - \frac{C_{p2} C_\gamma}{C_\alpha C_\beta + C_\beta C_\gamma + C_\gamma C_\alpha}\right)\right)}{\left(C_{p1}\left(1 - \frac{C_{p1} C_\beta}{C_\alpha C_\beta + C_\beta C_\gamma + C_\gamma C_\alpha}\right) + C_{p2}\left(1 - \frac{C_{p2} C_\gamma}{C_\alpha C_\beta + C_\beta C_\gamma + C_\gamma C_\alpha}\right) + C_{p3}\left(1 - \frac{C_{p3} C_\alpha}{C_\alpha C_\beta + C_\beta C_\gamma + C_\gamma C_\alpha}\right)\right)} \times e^{j(\omega t + \frac{\pi}{2})}$$

Here, the inequalities below can be obtained from the formula (2).

$$1 \gg \frac{C_{p1}C_\beta}{C_\alpha C_\beta + C_\beta C_\gamma + C_\gamma C_\alpha}$$

$$1 \gg \frac{C_{p2}C_\gamma}{C_\alpha C_\beta + C_\beta C_\gamma + C_\gamma C_\alpha}$$

$$1 \gg \frac{C_{q3}C_\alpha}{C_\alpha C_\beta + C_\beta C_\gamma + C_\gamma C_\alpha}$$

Using such inequalities, the formula (30) can be approximated as in the formula (31) below.

$$v'_{a1-m2-b3} \approx v_0 \omega R \frac{C_{p1} - C_{p2} + \frac{-C_{p1}^2 C_\beta + C_{p2}^2 C_\gamma}{C_\alpha C_\beta + C_\beta C_\gamma + C_\gamma C_\alpha}}{\frac{C_{p1} + C_{p2}}{C_{q3}} + 1} e^{j(\omega t + \frac{\pi}{2})} = \quad (31)$$

$$V_3 e^{j(\omega t + \frac{\pi}{2})}$$

$$V_3 \equiv v_0 \omega R \frac{C_{p1} - C_{p2} + \frac{-C_{p1}^2 C_\beta + C_{p2}^2 C_\gamma}{C_\alpha C_\beta + C_\beta C_\gamma + C_\gamma C_\alpha}}{\frac{C_{p1} + C_{p2}}{C_{q3}} + 1} \quad (32)$$

Figure 14:
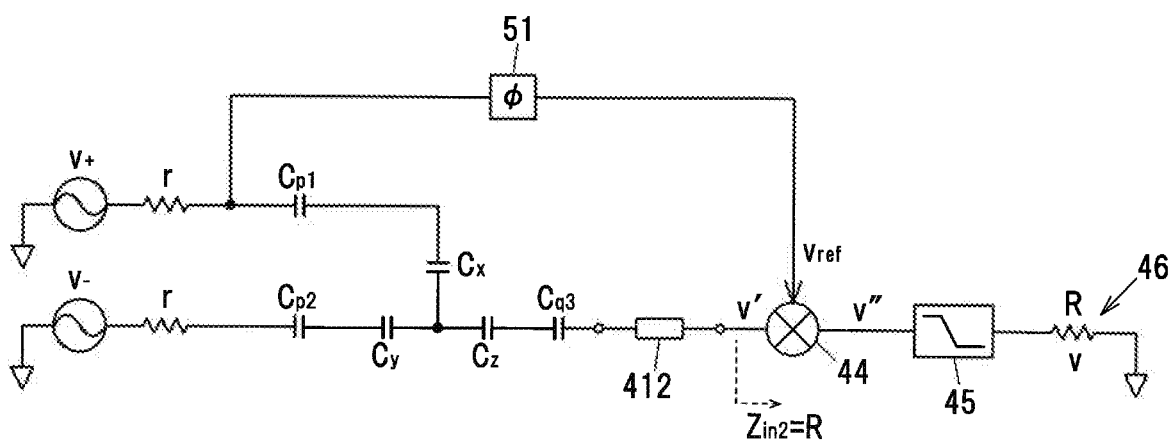
FIG. 14 is a circuit diagram after Δ-Y transformation of the circuit diagram of FIG. 13.

Then, as shown in FIG. 14, the signal output from the output electrode 412 and the reference signal $v_{ref}$ are multiplied with each other by the multiplier 44. At this time, using the formula (31) and the formula (5) expressing the voltage of the reference signal $v_{ref}$, voltage $v''_{a1-m2-b3}$ of the signal output from the multiplier 44 can be rearranged into the formula (33) below.

$$v''_{a1-m2-b3} \approx V_3 \cos\left(\omega t + \frac{\pi}{2}\right) \cdot u \cdot \cos\left(\omega t + \frac{\pi}{2}\right) = \frac{V_3 u}{2} [\cos(2\omega t + \pi) + 1] \quad (33)$$

Then, by leaving only the DC component in the formula (33) and returning $V_3$ defined by the formula (32) to the formula (33), the voltage $v_{a1-m2-b3}$ of the identification output signal output from the low-pass filter 45 can be expressed as the formula (34) below. The voltage $v_{a1-m2-b3}$ in the formula (34) below is voltage of the identification output signal when only the output switch device $SW_{b3}$ among the numerous output switch devices 42 is in the ON state.

$$v_{a1-m2-b3} \approx \frac{1}{2} v_0 u \omega R \frac{C_{p1} - C_{p2} + \frac{-C_{p1}^2 C_\beta + C_{p2}^2 C_\gamma}{C_\alpha C_\beta + C_\beta C_\gamma + C_\gamma C_\alpha}}{\frac{C_{p1} + C_{p2}}{C_{q3}} + 1} \quad (34)$$

In the way described above, the voltages $v_{a1-m2-b1}$, $v_{a1-m2-b2}$ and $v_{a1-m2-b3}$ of the identification output signal can be calculated respectively as in the formula (27), the formula (28) and the formula (34).

Here, given that the coupling capacitances $C_{p1}$, $C_{p2}$, $C_{q1}$, $C_{q2}$, $C_{q3}$ are all equal in the example of the circuit shown in FIG. 11, the voltage $v_{a1-m2-b1}$ is larger than each of the voltages $v_{a1-m2-b2}$, $v_{a1-m2-b3}$, from the formula (27), the formula (28) and the formula (34). Therefore, when there is no variation in the coupling capacitances $C_{p1}$, $C_{p2}$, $C_{q1}$, $C_{q2}$, $C_{q3}$, the second exposed end portion 822 which outputs the identification output signal with the highest voltage can be identified as the second exposed end portion 822 of the insulated wire 82 to which the identification input signal is input, by simply comparing the voltages $v_{a1-m2-b1}$, $v_{a1-m2-b2}$ and $v_{a1-m2-b3}$ of the identification input signal.

However, when there is a variation in, e.g., the coupling capacitances $C_{q1}$, $C_{q2}$, $C_{q3}$, it causes $v_{a1-m2-b1} < v_{a1-m2-b2}$ or $v_{a1-m2-b1} < v_{a1-m2-b3}$ and may lead to misdetection in identification of the correspondence relations between the numerous first exposed end portions 821 and the numerous second exposed end portions 822. That is, $v_{a1-m2-b1}$ is positively correlated with the coupling capacitance $C_{q1}$ as can be seen from the formula (27), $v_{a1-m2-b2}$ is positively correlated with the coupling capacitance $C_{q2}$ as can be seen from the formula (28) and $v_{a1-m2-b3}$ is positively correlated with the coupling capacitance $C_{q3}$ as can be seen from the formula (34). Therefore, when the coupling capacitance $C_{q1}$ is smaller than each of the coupling capacitances $C_{q2}$ and $C_{q3}$, the relation $v_{a1-m2-b1} < v_{a1-m2-b2}$ or $v_{a1-m2-b1} < v_{a1-m2-b3}$ holds true and misdetection may occur. For example, when the diameter of the second exposed end portion 822 of the first insulated wire 82a as the output-side identification target is smaller than the diameter of the second exposed end portions 822 of the other insulated wires 82 due to tolerance or when the position of the second exposed end portion 822 of the first insulated wire 82a as the output-side identification target relative to the output electrode 412 deviates from a desired position, the coupling capacitance $C_{q1}$ can be smaller than each of the coupling capacitances $C_{q2}$ and $C_{q3}$.

Therefore, the voltage value of the identification output signal is corrected to a correction voltage value that is less likely to be affected by variation in capacitances between the numerous second exposed end portions 822 and the numerous output electrodes 412 facing each other. Correction voltage values $vc_{a1-m2-b1}$, $vc_{a1-m2-b2}$, $vc_{a1-m2-b3}$ are expressed by the next formulas (35) to (37), where the correction voltage value $vc_{a1-m2-b1}$ is a value obtained by correcting the voltage $v_{a1-m2-b1}$, the correction voltage value $vc_{a1-m2-b2}$ is a value obtained by correcting the voltage $v_{a1-m2-b2}$, and the correction voltage value $vc_{a1-m2-b3}$ is a value obtained by correcting the voltage $v_{a1-m2-b3}$.

$$vc_{a1-m2-b1} = v_{a1-m2-b1} \times \text{correction coefficient} \quad (35)$$

$$= v_{a1-m2-b1} \times \frac{\frac{C_{p1}+C_{p2}}{C_{q1}}+1}{\frac{C_{p1}+C_{p2}}{C_{qr}}+1}$$

$$vc_{a1-m2-b2} = v_{a1-m2-b2} \times \text{correction coefficient} \quad (36)$$

$$= v_{a1-m2-b2} \times \frac{\frac{C_{p1}+C_{p2}}{C_{q2}}+1}{\frac{C_{p1}+C_{p2}}{C_{qr}}+1}$$

$$vc_{a1-m2-b3} = v_{a1-m2-b3} \times \text{correction coefficient} \quad (37)$$

$$= v_{a1-m2-b3} \times \frac{\frac{C_{p1}+C_{p2}}{C_{q3}}+1}{\frac{C_{p1}+C_{p2}}{C_{qr}}+1}$$

As expressed by the formulas (35) to (37), a correction voltage value vc is obtained by multiplying the voltage v of the identification output signal output from the second exposed end portion 822 as the output-side identification target by a correction coefficient negatively correlated with the coupling capacitance $C_{qx}$ between the second exposed end portion 822 as the output-side identification target and the output electrode 412. It is thereby possible to calculate the correction voltage value which is less affected by the coupling capacitance $C_{qx}$ between the second exposed end portion 822 as the output-side identification target and the output electrode 412.

Meanwhile, the correction coefficient is a product of a term negatively correlated with the coupling capacitance $C_{qx}$ between the second exposed end portion 822 outputting the identification output signal and the output electrode 412 (i.e., a numerator of the correction coefficient appearing in the formula (35) to (37)) and a term positively correlated with a reference coupling capacitance indicating a predetermined reference value for the coupling capacitances between the second exposed end portions 822 and the output electrodes 412 facing each other (i.e. a term obtained by removing the numerator from the correction coefficient appearing in the formula (35) to (37)). In the first embodiment, the term positively correlated with the reference coupling capacitance indicating a predetermined reference value for the coupling capacitances between the second exposed end portions 822 and the output electrodes 412 facing each other is a term obtained by changing the coupling capacitance $C_{qx}$ to the reference coupling capacitance in the term negatively correlated with the coupling capacitance $C_{qx}$ between the second exposed end portion 822 outputting the identification output signal and the output electrode 412. The reference coupling capacitance is a value anticipated to be close to each of the coupling capacitances between the numerous second exposed end portions 822 and the numerous output electrodes 412 facing each other, and it is $C_{qr}$ in the first embodiment. In this way, it is possible to prevent the correction coefficient from being a numerical value significantly far from 1, and to prevent the correction voltage value from significantly deviating from the voltage value of the identification output signal from which the correction voltage value is calculated. However, the reference coupling capacitance is not limited thereto and can be, e.g., a coupling capacitance between a given first exposed end portion 821 and the output electrode 412 facing thereto.

The correction voltage values $vc_{a1-m2-b1}$, $vc_{a1-m2-b2}$, $vc_{a1-m2-b3}$ expressed by the formulas (35) to (37) can be obtained by substituting the theoretical values, which are estimated by the estimation unit 612 and expressed by the formulas (14) to (19), with the coupling capacitances $C_{p1}$, $C_{p2}$, $C_{q1}$, $C_{q3}$, $C_{qr}$ appearing in the formula (35) to (37). Then, the second exposed end portion 822, which outputs the identification output signal from which the largest correction voltage value vc among the obtained correction voltage values vc is calculated, is identified as the second exposed end portion 822 corresponding to the first exposed end portion 821 to which the identification input signal is input. Thus, even when there is a variation in the coupling capacitances between the numerous second exposed end portions 822 and the numerous output electrodes 412, the correspondence relations between the numerous first exposed end portions 821 and the numerous second exposed end portions 822 can be highly accurately identified by performing the identification of the correspondence relations based on the correction voltage values which are less affected by the coupling capacitances between the numerous second exposed end portions 822 and the numerous output electrodes 412. The second exposed end portions 822 corresponding to the first exposed end portions 821 of the insulated wires 82 other than the first insulated wire 82a can also be identified based on the same theory as described above.

(Coupling Capacitance Estimation Method)

Figure 15:
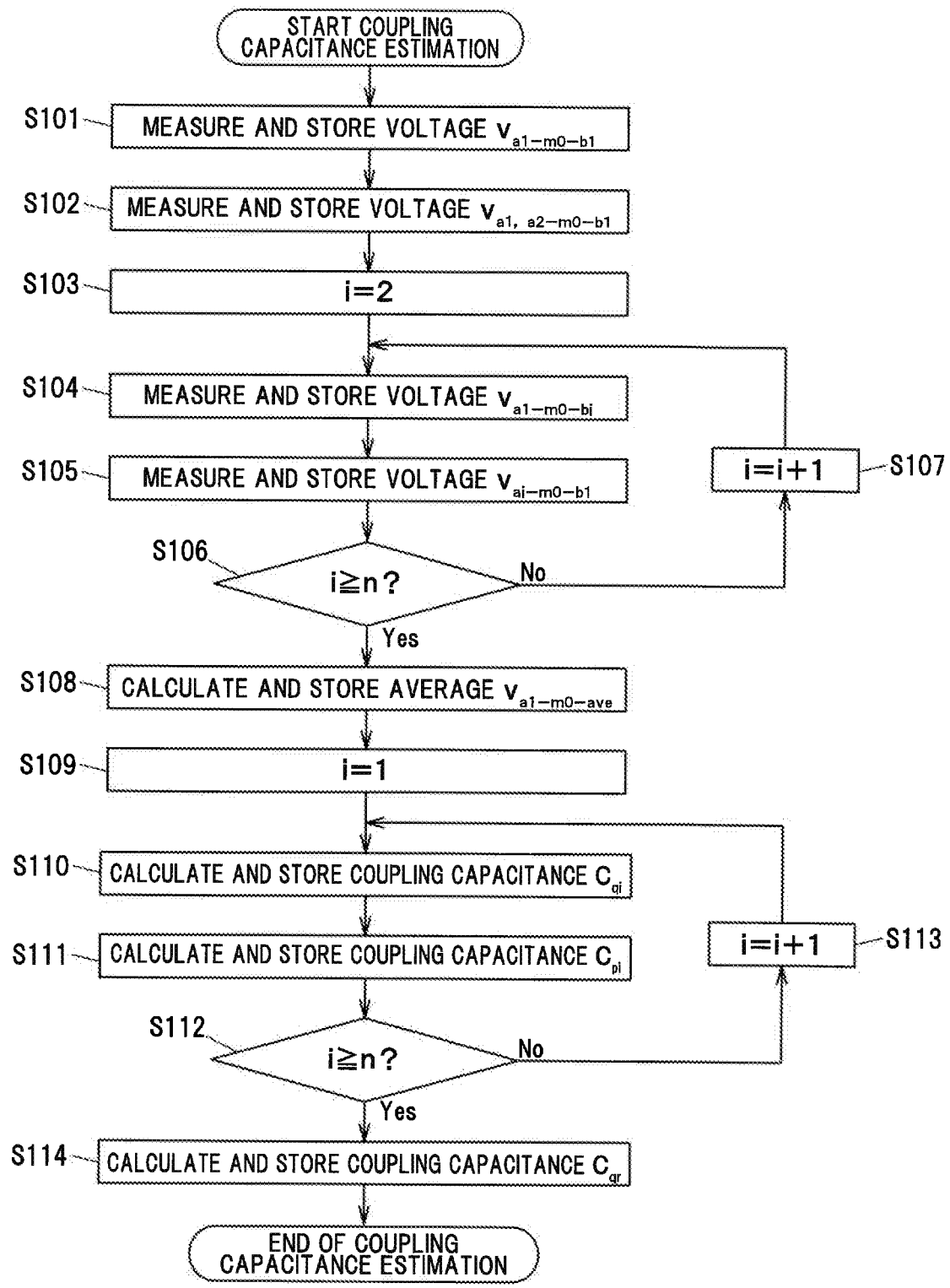
FIG. 15 is a flowchart for coupling capacitance estimation in the first embodiment.

Next, an example of a method for estimating the respective coupling capacitances between the numerous first exposed end portions 821 and the numerous input electrodes 242 and the respective coupling capacitances between the numerous second exposed end portions 822 and the numerous output electrodes 412 will be described. FIG. 15 is a flowchart for coupling capacitance estimation. Hereinafter, the total number of the insulated wires 82 of the multicore cable 8 is denoted by the symbol n. In addition, numbers 1 to n are sequentially assigned to the first exposed end portions 821 of all insulated wires 82, and likewise, numbers 1 to n are sequentially assigned to the second exposed end portions 822 of the insulated wires 82. In addition, the main input switch device 23 electrically connected to the input electrode 242 facing a given $x^{th}$ first exposed end portion 821 is referred to as a main input switch device $SW_{ax}$, and the output switch device 42 electrically connected to the output electrode 412 facing a given $x^{th}$ second exposed end portion 822 is referred to as an output switch device $SW_{bx}$.

For estimating the coupling capacitances, the total number n of the insulated wires 82 is input and stored in the storage unit 62. Then, a step of measuring the voltage value of the measurement output signal, which is output by capacitive coupling from the second exposed end portion 822 through the output electrode 412 when all the auxiliary switch devices 33 are turned into the OFF state and the measurement input signal is input by capacitive coupling from the input electrode 242 to the first exposed end portion 821, is performed with plural predetermined different combinations of the input electrodes 242 to input the measurement input signal and the output electrodes 412 to output the measurement output signal (Steps S101-S107). The plural predetermined combinations are combinations that yield the voltage values of all the measurement output signals appearing in the theoretical formulas for the respective coupling capacitances between the numerous first exposed end portions 821 and the numerous input electrodes 242 and the respective coupling capacitances between the numerous second exposed end portions 822 and the numerous output electrodes 412 (e.g., the formulas (14) to (19)). Steps S101-S107 are performed by the first measurement unit 611.

In Step S101, the voltage $v_{a1-m0-b1}$ is measured by the first measurement unit 611. The voltage $v_{a1-m0-b1}$ is voltage of the measurement output signal when the main input switch device $SW_{a1}$ and the output switch device $SW_{b1}$ are in the ON state, and the other main input switch devices 23, the other output switch devices 42 and all the auxiliary switch devices 33 are in the OFF state. The measurement result of the voltage $v_{a1-m0-b1}$ is stored in the storage unit 62.

Next, in Step S102, the voltage $v_{a1, a2-m0-b1}$ is measured by the first measurement unit 611. The voltage $v_{a1,a2-m0-b1}$ is voltage of the measurement output signal when both the main input switch devices $SW_{a1}$, $SW_{a2}$ and the output switch device $SW_{b1}$ are in the ON state, and the other main input switch devices 23, the other output switch devices 42 and all the auxiliary switch devices 33 are in the OFF state. The measurement result of the voltage $v_{a1,a2-m0-b1}$ is stored in the storage unit 62.

Next, voltage $v_{a1-m0-b1}$ and voltage $v_{a1-m0-b1}$, when a variable i is set to 2 to n, are measured and stored (Steps S103-S107). The voltage $v_{a1-m0-b1}$ is voltage of the measurement output signal when the main input switch device $SW_{a1}$ and the output switch device $SW_{bi}$ are in the ON state, and the other main input switch devices 23, the other output switch devices 42 and all the auxiliary switch devices 33 are in the OFF state. The voltage $v_{ai-m0-b1}$ is voltage of the measurement output signal when the main input switch device $SW_{ai}$ and the output switch device $SW_{b1}$ are in the ON state, and the other main input switch devices 23, the other output switch devices 42 and all the auxiliary switch devices 33 are in the OFF state.

Firstly, in Step S103, the variable i is initialized to 2. Next, in Step S104, the voltage $v_{a1-m0-bi}$ with i=2 is measured and stored in the storage unit 62. Next, in Step S105, the voltage $v_{ai-m0-b1}$ with i=2 is measured and stored in the storage unit 62. Next, in Step S106, whether or not the variable i is not less than the total number n of the insulated wires 82 is determined. Since the variable i is 2 at this moment, determination made in Step S106 is No and the process proceeds to Step S107. 1 is added to the current variable i in Step S107, and the process returns to Step S104. Then, the process of Steps S104-S105 is performed until it is determined in Step S106 that the variable i is not less than the total number n of the insulated wires 82, and once it is determined that the variable i is not less than the total number n, the process proceeds to Step S108.

In Step S108, the average $v_{a1-m0-ave}$ is calculated and stored. The average $v_{a1-m0-ave}$ is an average of the voltages $v_{a1-m0-bi}$ when the variable i is set to 1-n, and it is calculated using the values of the voltages $v_{a1-m0-bi}$ stored in the storage unit 62 (see Steps S101-S104). The calculated average $v_{a1-m0-ave}$ is stored in the storage unit 62.

Next, in Steps S109-S114, a calculation process is performed to calculate estimated values of the respective coupling capacitances between the numerous first exposed end portions 821 and the numerous input electrodes 242 and the respective coupling capacitances between the numerous second exposed end portions 822 and the numerous output electrodes 412. This process is performed by the estimation unit 612. A coupling capacitance between a given $x^{th}$ first exposed end portion 821 and the input electrode 242 facing thereto is indicated by the symbol $C_{px}$, and a coupling capacitance between a given $x^{th}$ second exposed end portion 822 and the output electrode 412 facing thereto is indicated by the symbol $C_{qx}$.

Firstly, in Step S109, the variable i is initialized to 1. Next, in Step S110, a coupling capacitance $C_{qi}$ with i=1 is calculated and stored in the storage unit 62. The coupling capacitance $C_{qi}$ is calculated according to the formula (16) described above and using the voltages $v_{a1-m0-b1}$ (i.e., the symbol α in the formula (16)), $v_{a2-m0-b1}$ (i.e., the symbol β in the formula (16)) and $v_{a1,2a-m0-b1}$ (i.e., the symbol γ in the formula (16)) stored in the storage unit 62. Next, in Step S111, a coupling capacitance $C_{pi}$ with i=1 is calculated and stored in the storage unit 62. The coupling capacitance $C_{pi}$ is calculated according to the formula (14) described above and using the voltages $v_{a1-m0-b1}$ (i.e., the symbol α in the formula (16)), $v_{a1-m0-b2}$ (i.e., the symbol β in the formula (16)) and $v_{a1,2a-m0-b1}$ (i.e., the symbol γ in the formula (16)) stored in the storage unit 62.

Next, in Step S112, whether or not the variable i is not less than the total number n of the insulated wires 82 is determined. Since the variable i is 1 at this moment, determination made in Step S112 is No and the process proceeds to Step S113. 1 is added to the current variable i in Step S113, and the process returns to Step S110. Then, according to the formulas (14)-(19) described above, the coupling capacitances $C_{qi}$, $C_{pi}$ for each variable i are sequentially calculated using various voltages $v_{ax-mo-by}$ (each of x and y is any value between 1 to n) stored in the storage unit 62. When it is determined in Step S112 that the variable i is not less than the total number n of the insulated wires 82, the process proceeds to the next Step S114.

In Step S114, the coupling capacitance $C_{qr}$ is calculated according to the formulas (13) and (19) described above. The coupling capacitance $C_{qr}$ is a numerical value used in a method for identifying corresponding ends (described later) and is thus calculated here.

In this way, it is possible to estimate the respective coupling capacitances between the numerous first exposed end portions 821 and the numerous input electrodes 242 and the respective coupling capacitances between the numerous second exposed end portions 822 and the numerous output electrodes 412.

(Method for Identifying Corresponding Ends)

Figure 16:
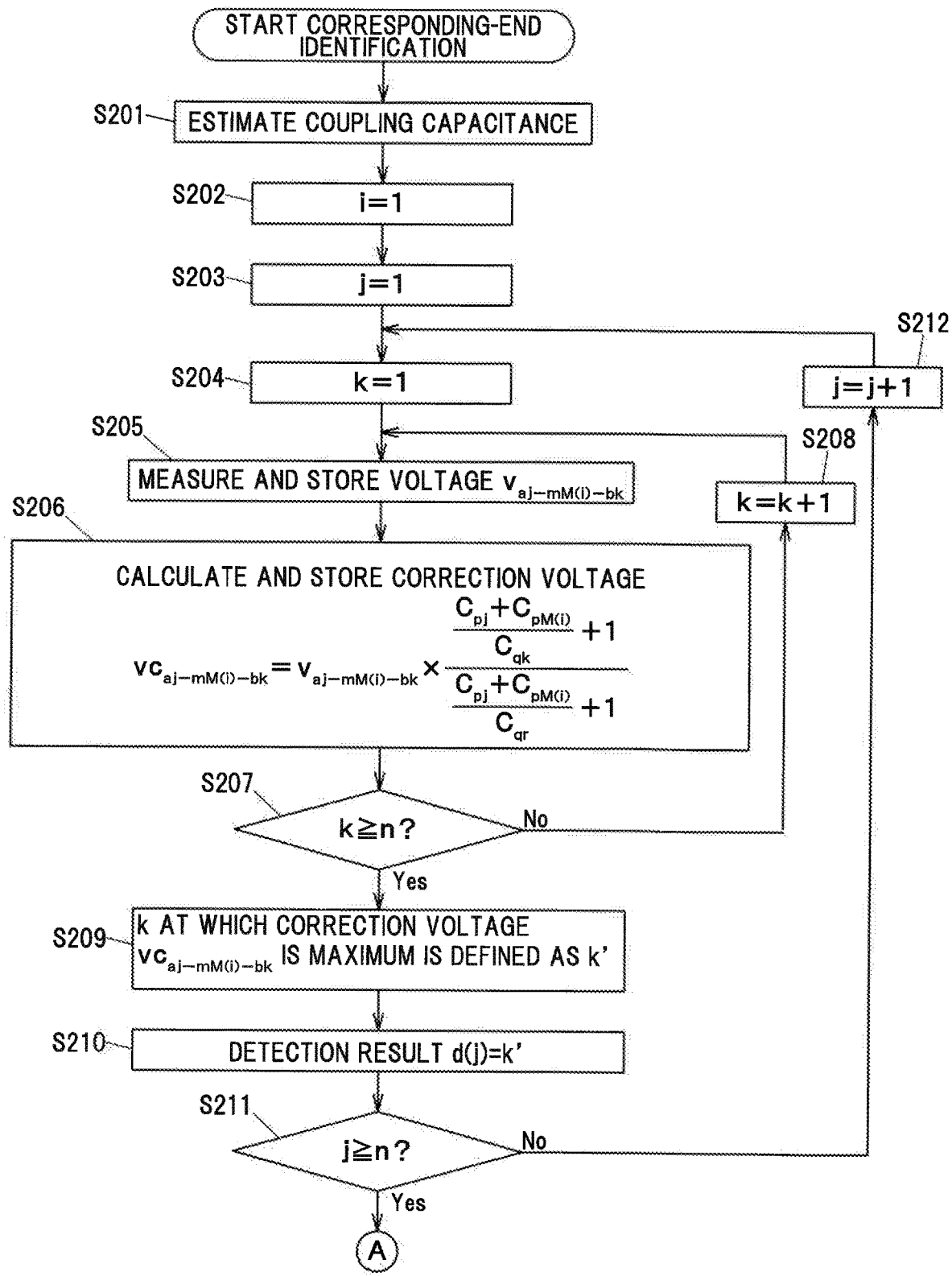
FIG. 16 is a flowchart of a method for identifying correspondence relations between numerous first exposed end portions and numerous second exposed end portions in the first embodiment.
Figure 17:
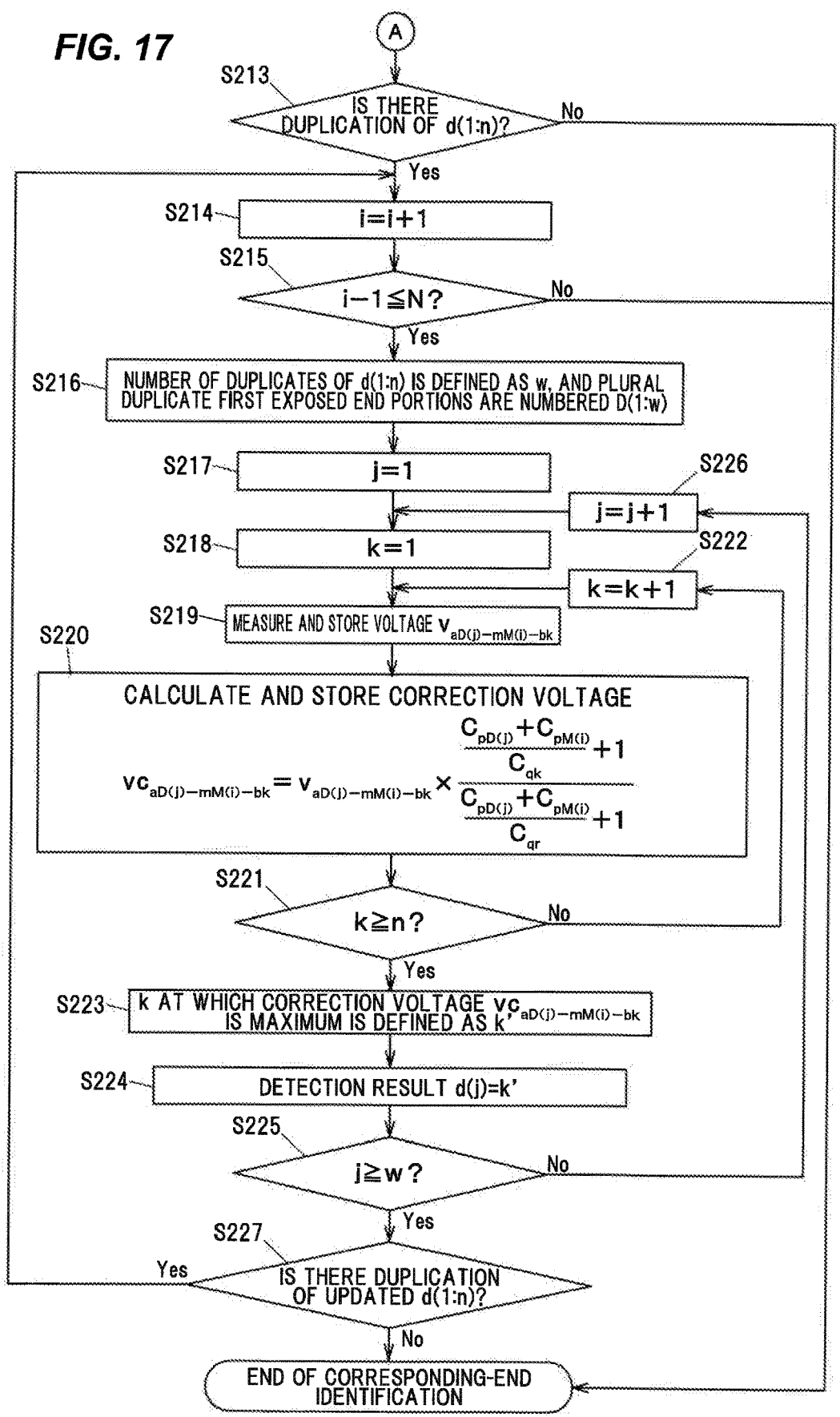
FIG. 17 is a flowchart of the method for identifying the correspondence relations between the numerous first exposed end portions and the numerous second exposed end portions in the first embodiment, and is a diagram illustrating a process following the process shown in FIG. 16.

Next, an example of a method for identifying the correspondence relations between the numerous first exposed end portions 821 and the numerous second exposed end portions 822 will be described. FIG. 16 is a flowchart of a method for identifying the correspondence relations between the numerous first exposed end portions 811 and the numerous second exposed end portions 822. FIG. 17 is a flowchart of the method for identifying the correspondence relations between the numerous first exposed end portions 811 and the numerous second exposed end portions 822, and is a diagram illustrating a process following the process shown in FIG. 16.

The method for identifying corresponding ends is a method for identifying the correspondence relations between the numerous first exposed end portions 821 and the numerous second exposed end portions 822, and Steps S201-S226 are performed. In the method for identifying corresponding ends, firstly, the respective coupling capacitances between the numerous first exposed end portions 821 and the numerous input electrodes 242 and the respective coupling capacitances between the numerous second exposed end portions 822 and the numerous output electrodes 412 are estimated in Step S201. Step S201 is the coupling capacitance estimation method described above (the process from Step S101 to Step S114 in FIG. 15).

Then, in Steps S202-S204, each of variables i, j, k is initialized to 1 (Steps S202-S204). Next, a voltage $v_{aj-mM(i)-bk}$ in this case is measured (Step S205). The voltage $v_{aj-mM(i)-bk}$ is voltage of the measurement output signal when a main input switch device $SW_{aj}$, an auxiliary switch device $SW_{mM(i)}$ and an output switch device $SW_{bk}$ are in the ON state, and the other main input switch devices 23, the other auxiliary switch devices 33 and the other output switch devices 42 are in the OFF state. The main input switch device $SW_{aj}$ is the main input switch device 23 electrically connected to the input electrode 242 facing the $j^{th}$ first exposed end portion 821. The auxiliary switch device $SW_{mM(i)}$ is the auxiliary switch device 33 electrically connected to the input electrode 242 facing a given $M(i)^{th}$ first exposed end portion 821. A function M(i) is a number from 1 to the total number n of the insulated wires 82 and is a function whose value changes according to the variable i. Meanwhile, the variable i is a number from 1 to N, and the function M(1) to the function M(N) are numbers different from each other. The output switch device $SW_{bk}$ is the output switch device 42 electrically connected to the output electrode 412 facing the second exposed end portion 822 of the $k^{th}$ insulated wire 82. The symbol N here indicates the upper limit of the number of times of a re-detection step (described later) and has a relationship of N≤n.

In Step S205 which is performed for the first time, the voltage $v_{aj-mM(i)-bk}$ when each of i, j, k is 1, i.e., a voltage $v_{a1-mM(1)-b1}$ is measured using the second measurement unit 613 and is stored in the storage unit 62. Next, in Step S206, a correction voltage value $vc_{aj-mM(i)-bk}$ is calculated using the voltage $v_{aj-mM(i)-bk}$ measured in the immediately previously performed Step S205, $C_{pj}$, $C_{pM(i)}$, $C_{qr}$, $C_{qk}$ estimated in Step S201 and a formula shown in Step S206 of FIG. 16, and is stored in the storage unit 62. Next, in Step S207, whether or not the variable k is not less than the total number n of the insulated wires 82 is determined. Since the variable k is 1 at this moment, determination made in Step S207 is No and the process proceeds to Step S208. 1 is added to the current variable k in Step S208, and the process returns to Step S205. Then, the process of Steps S205-S206 is performed until it is determined in Step S207 that the variable k is not less than the total number n of the insulated wires 82.

When it is determined in Step S207 that the variable k is not less than the total number n, the process proceeds to the next Step S209. When it is determined that the variable k is not less than the total number n, it is in a state in which the voltages $v_{a1-mM(1)-b1}$-$v_{a1-M(1)-bn}$ and their respective correction voltage values $vc_{a1-mM(1)-b1}$-$vc_{a1-mM(1)-bn}$ are obtained. The voltages $v_{a1-mM(1)-b1}$-$v_{a1-mM(1)-bn}$ are voltages of the identification input signals that are respectively output from all the second exposed end portions in the state in which the identification input signal is input to the $1^{st}$ first exposed end portion and the auxiliary signal V- to the $M(1)^{st}$ first exposed end portion. The correction voltage values $vc_{a1-mM(1)-b1}$-$vc_{a1-mM(1)-bn}$ are correction voltage values calculated based on the respective voltages of the identification output signals measured as described above.

Steps S209 and S210 are performed by the corresponding-end identifying unit 614. In Step S209, the variable k yielding the largest of the correction voltage values $vc_{a1-mM(1)-bk}$ (where the variable k is 1 to n) stored in the storage unit 62 is defined as k'. That is, the value k' is the number assigned to the second exposed end portion 822 corresponding to the $1^{st}$ first exposed end portion 821.

Next, in Step S210, the formula d(j)=k' is provided using a function d(j). The formula d(j)=k' indicates that the second exposed end portion 822 corresponding to the $j^{th}$ first exposed end portion 821 is the $k^{th}$ second exposed end portion 822 of the right-hand side. Since the variable j is 1 at this moment, d(1)=k' is determined in Step S210 which is performed for the first time. In other words, in Step S210 which is performed for the first time, the second exposed end portion 822 corresponding to the $1^{st}$ first exposed end portion 821 is identified. Then, information of d(1)=k' is stored in the storage unit 62.

Next, in Step S211, whether or not the variable j is not less than the total number n of the insulated wires 82 is determined. Since the variable j is 1 at this moment, determination made in Step S211 is No and the process proceeds to Step S212. 1 is added to the current variable j in Step S212, and the process returns to Step S204. Then, the process of Steps S204-S210 is performed until it is determined in Step S211 that the variable j is not less than the total number n of the insulated wires 82.

When it is determined that the variable j is not less than the total number n, the process proceeds to the next Step S213 shown in FIG. 17. When it is determined that the variable j is not less than the total number n, it is in a state in which each of the functions d(1) to d(n) is determined, i.e., the second exposed end portions 822 respectively corresponding to all the first exposed end portions 821 are identified.

Step S213 is performed by the misdetection determination unit 615. In Step S213, whether or not there is a duplication in the functions d(1) to d(n) stored in the storage unit 62 is determined. When there is no duplication in the functions d(1) to d(n), it is determined that the correspondence relations between the numerous first exposed end portions 821 and the numerous second exposed end portions 822 are accurately obtained, and the corresponding-end identification process is ended. On the other hand, when there is a duplication in the functions d(1) to d(n), the second exposed end portions 822 corresponding to plural specific first exposed end portions 821 are duplicates, hence, there is misdetection. Thus, in Steps S214-S227, the correspondence relations for the plural first exposed end portions 821 which correspond to the duplicate second exposed end portions 822 are reidentified.

Firstly, 1 is added to the variable i (which is 1 at this moment) in Step S214. The process in Step S214 is a preparation for measurement of a voltage $v_{aD(j)-mM(i)-bk}$ of the identification output signal in Step S219 (described later). That is, the process in Step S214 is a process performed so that the first exposed end portion 821 to which the auxiliary signal V- is input in Step S219 is assigned with a number M(i) which is different from the number assigned to the first exposed end portion 821 to which the auxiliary signal V- has been already input (i.e., different from the value of the function M(1)).

Next, in Step S215, whether the numerical value i−1 is not more than a maximum re-detection count N is determined. The numerical value i−1 in Step S215 is a numerical value indicating how many times the re-detection step (i.e., the process from Step S216-Step S226) immediately after Step S215 has been performed. Meanwhile, the maximum re-detection count N indicates the upper limit for the number of times of repetitions of the re-detection step and is specified beforehand. If the maximum re-detection count N is large, the possibility of misdetection is reduced but the system load increases. From the viewpoint of suppressing the increase in the system load while reducing the possibility of misdetection, the maximum re-detection count N can be not less than 10 and not more than 100, in more particular, not less than 10 and not more than 50, as an example. When the numerical value i−1 is not more than the maximum re-detection count N in Step S215, the process proceeds to the re-detection step (i.e., the process from Step S216 to Step S226). On the other hand, when the numerical value i−1 is more than the maximum re-detection count N, the corresponding-end identification process is ended.

In the re-detection step (i.e., in the process from Step S216-Step S226), firstly in Step S216, the number of duplicates in d(1)-d(n) is defined as w. That is, as an example, when d(1) and d(6) are both 2 and d(3) and d(8) are both 7, then the number w of duplicates is 4. In addition, plural duplicate-corresponding first exposed end portions, which are the first exposed end portions 821 determined to correspond to the duplicate second exposed end portions 822, are sequentially numbered D(1) through D(w).

Next, the variable j is initialized to 1 in Step S217 and the variable k is initialized to 1 in Step S218. Next, in Step S219, voltage $v_{aD(1)-mM(2)-b1}$ is measured by the second measurement unit 613. The voltage $v_{aD(1)-mM(2)-b1}$ is voltage of the identification output signal when the main input switch device 23 electrically connected to the input electrode 242 facing the $D(1)^{st}$ first exposed end portion 821, the auxiliary switch device 33 electrically connected to the input electrode 242 facing the $M(2)^{nd}$ first exposed end portion 821 and the output switch device 42 electrically connected to the output electrode 412 facing the 1$^{st}$ second exposed end portion are in the ON state, and the other main input switch devices 23, the other auxiliary switch devices 33 and the other output switch devices 42 are in the OFF state. The measurement result of the voltage $v_{aD(1)-mM(2)-b1}$ is stored in the storage unit 62.

Next, in Step S220, a correction voltage value $vc_{aD(j)-mM(i)-bk}$ (a correction voltage value $vc_{aD(1)-mM(2)-b1}$ at this moment) obtained by correcting the voltage $v_{aD(j)-mM(i)-bk}$ (the voltage $v_{aD(1)-mM(2)-b1}$ at this moment) measured in the immediately previously performed Step S219 using the formula shown in Step S220 of FIG. 17 is calculated and stored in the storage unit 62. Next, in Step S221, whether or not the variable k is not less than the total number n of the insulated wires 82 is determined. Since the variable k is 1 at this moment, determination made in Step S221 is No and the process proceeds to Step S222. 1 is added to the current variable k in Step S222, and the process returns to Step S219. Then, the process of Steps S219-S220 is performed until it is determined in Step S221 that the variable k is not less than the total number n of the insulated wires 82.

When it is determined in Step S211 that the variable k is not less than the total number n, the process proceeds to the next Step S223. When it is determined that the variable k is not less than the total number n, it is in a state in which the voltages $v_{aD(1)-mM(2)-b1}$-$v_{aD(1)-mM(2)-bn}$ and their respective correction voltage values $vc_{aD(1)-mM(2)-b1}$-$vc_{aD(1)-mM(2)-bn}$ are obtained. The voltages $v_{aD(1)-mM(2)-b1}$-$v_{aD(1)-mM(2)-bn}$ are the measured values of the voltages of the identification output signals respectively output from all the second exposed end portions in the state in which the identification input signal is input to the D(1)$^{st}$ first exposed end portion and the auxiliary signal V− to the M(2)$^{nd}$ first exposed end portion. The correction voltage values $vc_{aD(1)-mM(2)-b1}$-$vc_{aD(1)-mM(2)-bn}$ are correction voltage values calculated based on the respective voltages of the identification output signals measured as described above.

Steps S223-S224 are performed by the corresponding-end identifying unit 614. In Step S223, the variable k yielding the largest of the correction voltage values $vc_{aD(1)-mM(2)-bn}$ (where the variable k is 1 to n) stored in the storage unit 62 is defined as k'. That is, the value k' is the number assigned to the second exposed end portion 822 corresponding to the D(1)$^{st}$ first exposed end portion 821.

Next, in Step S224, the formula d(D(j))=k' is provided using a function d(D(j)). The formula d(D(j))=k' indicates that the second exposed end portion 822 corresponding to the D(j)$^{th}$ first exposed end portion 821 is the k'$^{th}$ second exposed end portion 822 of the right-hand side. In Step S224 which is performed for the first time, the second exposed end portion 822 corresponding to the D(1)$^{st}$ first exposed end portion 821 is identified. Then, information of d(D(1))=k' is stored in the storage unit 62.

Next, in Step S225, whether or not the variable j is not less than the total number w of the duplicate-corresponding first exposed end portions is determined. Since the variable j is 1 at this moment, determination made in Step S225 is No and the process proceeds to Step S226. 1 is added to the current variable j in Step S226, and the process returns to Step S218. Then, the process of Steps S218-S224 is performed until it is determined in Step S225 that the variable j is not less than the total number w of the duplicate-corresponding first exposed end portions.

When it is determined that the variable j is not less than the total number w of the duplicate-corresponding first exposed end portions, the process proceeds to Step S227. When it is determined that the variable j is not less than the total number w of the duplicate-corresponding first exposed end portions, it is in a state in which each of the functions d(D(1)) to d(D(w)) is determined, i.e., the second exposed end portions 822 respectively corresponding to all the duplicate-corresponding first exposed end portions are identified.

In Step S227, whether or not there is a duplication in d(1) to d(n) after being updated with the values of the functions d(D(1)) to d(D(w)) is determined. When there is no duplication in the functions d(1) to d(n), it is determined that the correspondence relations between the numerous first exposed end portions 821 and the numerous second exposed end portions 822 are accurately obtained, and the corresponding-end identification process is ended. On the other hand, when there is a duplication in the functions d(1) to d(n), the second exposed end portions 822 corresponding to plural first exposed end portions 821 are duplicates, hence, there is still misdetection. Thus, in Steps S214-S227, the correspondence relations for the plural first exposed end portions 821 which correspond to the duplicate second exposed end portions 822 are reidentified. This is repeated until no duplication is found in the functions d(1) to d(n) (i.e., until it is determined No in Step S227), or until the numerical value i−1 exceeds the maximum re-detection count N (i.e., until it is determined No in Step S215).

In this way, it is possible to highly accurately identify the correspondence relations between the numerous first exposed end portions 821 and the numerous second exposed end portions 822.

(Simulation for Verification of Effectiveness)

Next, results of simulating accuracy of identifying the correspondence relations between the numerous first exposed end portions 821 and the numerous second exposed end portions 822 in the first embodiment will be described.

Here, a simulation was performed to calculate the accuracy of identifying the correspondence relations in three cases: Example, Reference Example, Comparative Example. In Reference Example and Comparative Example, the voltage values of the identification output signals respectively output from the second exposed end portions 822 were compared without correction, the second exposed end portion 822 which outputted the identification output signal with the largest voltage value was determined as the second exposed end portion 822 corresponding to the first exposed end portion 821 as the input-side identification target, and the rest of the process was performed in the same manner as in the first embodiment. In Example, the correspondence relations between the numerous first exposed end portions 821 and the numerous second exposed end portions 822 were identified while correcting the voltage values of the identification output signals as in the first embodiment.

In both Example and Comparative Example, it is assumed that there is a variation in the respective coupling capacitances between the numerous insulated wires 82 and the electrodes respectively facing thereto. In Reference Example, it is assumed that the respective coupling capacitances between the numerous insulated wires 82 and the electrodes respectively facing thereto are constant (no variation), which is an ideal case. The values of the various parameters used to perform the simulation are shown in Table 1 above.

Firstly, an SN ratio in each of Example, Reference Example and Comparative Example was obtained. The SN ratio in Reference Example and Comparative Example is a value obtained by dividing voltage of the identification output signal, which is output from the second exposed end portion 822 of the first insulated wire 82a when the identification input signal is input to the first insulated wire 82a and the reference signal $v_{ref}$ to the second insulated wire 82b, by voltage of the identification output signal which is output from the second exposed end portion 822 of the third insulated wire 82c. Meanwhile, the SN ratio in Example is a value obtained by dividing a correction voltage value, which is calculated based on the voltage of the identification output signal output from the second exposed end portion 822 of the first insulated wire 82a when the identification input signal is input to the first insulated wire 82a and the reference signal $v_{ref}$ to the second insulated wire 82b, by a correction voltage value which is calculated based on the voltage of the identification output signal output from the second exposed end portion 822 of the third insulated wire 82c. The larger the SN ratio, the smaller the effect of noise when identifying the correspondence relations between the numerous first exposed end portions 821 and the numerous second exposed end portions 822, and it is particularly preferable that the SN ratio be greater than 1.

The SN ratio in Reference Example was 15.2, the SN ratio in Comparative Example was 0.7, and the SN ratio in Example was 14.9. That is, in Example in which the correspondence relations between the numerous first exposed end portions 821 and the numerous second exposed end portions 822 are identified based on the correction voltage values, the SN ratio was significantly larger than 1 and was at a level equivalent to that of Reference Example which is in an ideal condition.

Identification of the correspondence relations between the numerous first exposed end portions 821 and the numerous second exposed end portions 822 was also simulated in Example, Reference Example and Comparative Example. The result was such that misdetection occurred in Comparative Example but did not occur in Example and Reference Example. This indicates that it is easy to improve accuracy of identifying the correspondence relations when the correspondence relations between the numerous first exposed end portions 821 and the numerous second exposed end portions 822 are identified based on the correction voltage values.

(Functions and Effects of the First Embodiment)

In the first embodiment, the respective coupling capacitances between the numerous input electrodes 242 and the numerous first exposed end portions 821 facing each other and the respective coupling capacitances between the numerous output electrodes 412 and the numerous second exposed end portions 822 facing each other are estimated based on the measured voltage values of the plural measurement output signals. Therefore, it is possible to easily know the respective coupling capacitances between the numerous input electrodes 242 and the numerous first exposed end portions 821 facing each other and the respective coupling capacitances between the numerous output electrodes 412 and the numerous second exposed end portions 822 facing each other.

In addition, in the first embodiment, the correction voltage value obtained by multiplying the voltage value of the identification output signal output from the second exposed end portion 822 as the output-side identification target by the correction coefficient negatively correlated with the coupling capacitance between the second exposed end portion 822 as the output-side identification target and the output electrode 412 is calculated using the estimated value of the coupling capacitance between the second exposed end portion 822 as the output-side identification target and the output electrode 412 that is estimated by the coupling capacitance estimation method. Then, the second exposed end portion 822 corresponding to the first exposed end portion 821 as the input-side identification target is identified based on each calculated correction voltage value. Therefore, even when there is a variation in the coupling capacitances between the numerous second exposed end portions 822 and the numerous output electrodes 412, the correspondence relations between the numerous first exposed end portions 821 and the numerous second exposed end portions 822 can be highly accurately identified by performing the corresponding-end identification based on the correction voltage values which are less affected by the coupling capacitances between the numerous second exposed end portions 822 and the numerous output electrodes 412.

In addition, the correction coefficient is a product of a term negatively correlated with the coupling capacitance between the second exposed end portion 822 as the output-side identification target and the output electrode 412 and a term positively correlated with the reference coupling capacitance indicating a predetermined reference value for the coupling capacitances between the second exposed end portions 822 and the output electrodes 412 facing each other. Therefore, the effect of the coupling capacitances between the numerous second exposed end portions 822 and the numerous output electrodes 412 on the correction voltage value can be reduced by the term negatively correlated with the coupling capacitance between the second exposed end portion 822 outputting the identification output signal and the output electrode 412, and the correction voltage value is easily prevented from fluctuating significantly from the voltage of the identification output signal before correction by the term positively correlated with the reference coupling capacitance indicating a predetermined reference value for the coupling capacitances between the second exposed end portions 822 and the output electrodes 412 facing thereto.

As described above, according to the first embodiment, it is possible to provide a coupling capacitance estimation method, a method for identifying corresponding ends of a multicore cable, a coupling capacitance estimation device and a method for manufacturing a multicore cable assembly, which are capable of estimating respective coupling capacitances between numerous input electrodes and numerous first exposed end portions facing each other and respective capacitances between numerous output electrodes and numerous second exposed end portions facing each other.

Second Embodiment

In the second embodiment, the correction voltage value is different from that in the first embodiment and the rest of the configuration is the same as the first embodiment. In the second embodiment, the correction coefficient is a product of a term positively correlated with the average of the voltage values of the measurement output signals respectively output from the numerous second exposed end portions 822 when the measurement input signal is input to the first exposed end portion 821 as the input-side identification target by the first measurement unit 611, and a term negatively correlated with the voltage value of the measurement output signal output from the second exposed end portion 822 as the output-side identification target when the measurement input signal is input to the first exposed end portion 821 as the input-side identification target. That is, the correction voltage values $vc_{a1-m2-b1}$, $vc_{a1-m2-b2}$, $vc_{a1-m2-b3}$ expressed by the formulas (35) to (37) are expressed as the following formulas (38) to (40) in the second embodiment.

$$vc_{a1-m2-b1} = v_{a1-m2-b1} \times \text{correction coefficient} \quad (38)$$

$$= v_{a1-m2-b1} \times \frac{v_{p1-m0-ave}}{v_{p1-m0-b1}}$$

$$vc_{a1-m2-b2} = v_{a1-m2-b2} \times \text{correction coefficient} \quad (39)$$

$$= v_{a1-m2-b2} \times \frac{v_{p1-m0-ave}}{v_{p1-m0-b2}}$$

$$vc_{a1-m2-b3} = v_{a1-m2-b3} \times \text{correction coefficient} \quad (40)$$

$$= v_{a1-m2-b3} \times \frac{v_{p1-m0-ave}}{v_{p1-m0-b3}}$$

Although the details will be described later, the correction coefficient in the formulas (38) to (40) above is negatively correlated with the coupling capacitance between the second exposed end portion 822 as the output-side identification target and the output electrode 412, in the same manner as the first embodiment. Therefore, the correction voltage values expressed by the formulas (38) to (40) are values which are less likely to be affected by the coupling capacitance between the second exposed end portion 822 as the output-side identification target and the output electrode 412 as described below. This is explained below.

The formulas (8), (9), (11) and (12) can be merged into the formula (41) below. In the following formula, each of s and t is one of 1 to 3.

$$v_{as-m0-bt} \approx \frac{A}{\frac{1}{C_{ps}} + \frac{1}{C_{qt}}} \quad (41)$$

Here, using the formula (41), $v_{as-m0-ave}$ is expressed as the formula (42) below.

$$v_{as-m0-ave} = \frac{1}{3}\sum_{k=1}^{3} v_{as-m0-bk} = \frac{A}{3}\sum_{k=1}^{3} \frac{1}{\frac{1}{C_{ps}} + \frac{1}{C_{qk}}} \quad (42)$$

From the above, the formulas (38) to (40) can be transformed into the following formulas (43) to (45) below.

$$vc_{a1-m2-b1} = v_{a1-m2-b1} \times \frac{\frac{1}{3}\sum_{k=1}^{3}\frac{1}{\frac{1}{C_{p1}} + \frac{1}{C_{qk}}}}{\frac{1}{\frac{1}{C_{p1}} + \frac{1}{C_{q1}}}} \quad (43)$$

$$vc_{a1-m2-b2} = v_{a1-m2-b2} \times \frac{\frac{1}{3}\sum_{k=1}^{3}\frac{1}{\frac{1}{C_{p1}} + \frac{1}{C_{qk}}}}{\frac{1}{\frac{1}{C_{p1}} + \frac{1}{C_{q2}}}} \quad (44)$$

$$vc_{a1-m2-b3} = v_{a1-m2-b3} \times \frac{\frac{1}{3}\sum_{k=1}^{3}\frac{1}{\frac{1}{C_{p1}} + \frac{1}{C_{qk}}}}{\frac{1}{\frac{1}{C_{p1}} + \frac{1}{C_{q3}}}} \quad (45)$$

It is understood that the voltage $v_{a1-m2-b1}$ appearing in the right-hand side of the formula (43) is positively correlated with $C_{q1}$ according to the formula (27), and the correction coefficient multiplied by this voltage $v_{a1-m2-b1}$ is negatively correlated with $C_{q1}$. Therefore, the correction voltage value $vc_{a1-m2-b1}$ expressed by the formula (43) can be less affected by the coupling capacitance $C_{q1}$. Likewise, the correction voltage value $vc_{a1-m2-b2}$ expressed by the formula (44) can be less affected by the coupling capacitance $C_{q2}$, and the correction voltage value $vc_{a1-m2-b3}$ expressed by the formula (45) can be less affected by the coupling capacitance $C_{q3}$. Therefore, even when there is a variation in the coupling capacitances between the numerous second exposed end portions 822 and the numerous output electrodes 412, the correspondence relations between the numerous first exposed end portions 821 and the numerous second exposed end portions 822 can be highly accurately identified by performing the corresponding-end identification based on the correction voltage values which are less affected by the coupling capacitances between the numerous second exposed end portions 822 and the numerous output electrodes 412.

The rest of the configuration is the same as that in the first embodiment.

Of the reference signs used in the second embodiment onward, the same reference signs as those used in the already described embodiment represent the same constituent elements, etc., as those in the already described embodiment unless otherwise specified.

(Functions and Effects of the Second Embodiment)

The same functions and effects as those in the first embodiment are also obtained in the second embodiment.

SUMMARY OF THE EMBODIMENTS

Technical ideas understood from the embodiments will be described below citing the reference signs, etc., used for the embodiments. However, each reference sign described below is not intended to limit the constituent elements in the claims to the members, etc., specifically described in the embodiments.

[1] A coupling capacitance estimation method, comprising: arranging numerous input electrodes (242) so as to respectively face first exposed end portions (821) of numerous insulated wires (82) exposed at one end of a multicore cable (8); arranging numerous output electrodes (412) so as to respectively face second exposed end portions (822) of the numerous insulated wires (82) exposed at another end of the multicore cable (8); performing measurement of a voltage value of a measurement output signal that is output by capacitive coupling from the second exposed end portion (822) through the output electrode (412) when a measurement input signal is input by capacitive coupling from the input electrode (242) to the first exposed end portion (821), with a plurality of predetermined different combinations of the input electrodes (242) to input the measurement input signal and the output electrodes (412) to output the measurement output signal; and based on the measured voltage values of a plurality of the measurement output signals, estimating respective coupling capacitances between the numerous input electrodes (242) and the numerous first exposed end portions (821) facing each other and respective coupling capacitances between the numerous output electrodes (412) and the numerous second exposed end portions (822) facing each other.

[2A] A method for identifying corresponding ends of a multicore cable that is a method for identifying correspondence relations between the numerous first exposed end portions (821) and the numerous second exposed end portions (822) by using the coupling capacitance estimation method defined by [1], the method comprising: inputting an identification input signal by capacitive coupling from the input electrode (242) to the first exposed end portion (821) as an input-side identification target among the numerous first exposed end portions (821), also inputting an auxiliary signal with an opposite phase to the identification input signal, by capacitive coupling, from the input electrode (242) to the first exposed end portion (821) among the numerous first exposed end portions (821) except the first exposed end portion (821) as the input-side identification target, and measuring voltage values of identification output signals output by capacitive coupling respectively from the numerous second exposed end portions (822) through the output electrodes (412); calculating correction voltage values by multiplying the respective voltage values of the identification output signals measured at the numerous second exposed end portions (822) by a correction coefficient calculated using estimated values of coupling capacitances estimated by the coupling capacitance estimation method; and based on the calculated correction voltage values, identifying the second exposed end portion (822) corresponding to the first exposed end portion (821) as the input-side identification target.

[2B] A method for identifying corresponding ends of a multicore cable that is a method for identifying correspondence relations between the numerous first exposed end portions (821) and the numerous second exposed end portions (822) by using the coupling capacitance estimation method defined by [1], the method comprising: performing measurement of a voltage value of an identification output signal that is output by capacitive coupling from the second exposed end portion (822) as an output-side identification target among the numerous second exposed end portions (822) through the output electrode (412) when an identification input signal is input by capacitive coupling from the input electrode (242) to the first exposed end portion (821) as an input-side identification target among the numerous first exposed end portions (821) and also an auxiliary signal with an opposite phase to the identification input signal is input by capacitive coupling from the input electrode (242) to a predetermined first exposed end portion (821) among the numerous first exposed end portions (821) except the first exposed end portion (821) as the input-side identification target, until all the second exposed end portions (822) become the output-side identification target; using an estimated value of coupling capacitance between the second exposed end portion (822) as the output-side identification target and the output electrode (412) that is estimated by the coupling capacitance estimation method, calculating a correction voltage value by multiplying the voltage value of the identification output signal output from the second exposed end portion (822) as the output-side identification target by a correction coefficient negatively correlated with the coupling capacitance between the second exposed end portion (822) as the output-side identification and the output electrode (412); and based on the calculated correction voltage value, identifying the second exposed end portion (822) corresponding to the first exposed end portion (821) as the input-side identification target.

[3A] The method for identifying corresponding ends of a multicore cable defined by [2A], wherein the correction coefficient multiplied by the voltage value of the identification output signal is a product of a term correlated with coupling capacitance between the second exposed end portion designated to output the identification output signal and the output electrode and a term correlated with reference coupling capacitance indicating a predetermined reference value for coupling capacitances between the numerous second exposed end portions and the numerous output electrodes facing each other.

[3B] The method for identifying corresponding ends of a multicore cable defined by [2B], wherein the correction coefficient is a product of a term negatively correlated with the coupling capacitance the second exposed end portion (822) as the output-side identification target and the output electrodes (412) and a term positively correlated with a reference coupling capacitance indicating a predetermined reference value for the coupling capacitances between the numerous second exposed end portions (822) and the numerous output electrodes (412) facing each other.

[4A] The method for identifying corresponding ends of a multicore cable defined by [2A], wherein the correction coefficient multiplied by the voltage value of the identification output signal is a product of a term correlated with an average of the voltage values of the measurement output signals respectively output from the numerous second exposed end portions when the measurement input signal is input to the first exposed end portion as the input-side identification target, and a term correlated with the voltage value of the measurement output signal output from the second exposed end portion designated to output the identification output signal when the measurement input signal is input to the first exposed end portion as the input-side identification target.

[4B] The method for identifying corresponding ends of a multicore cable defined by [2B], wherein the correction coefficient is a product of a term positively correlated with the average of the voltage values of the measurement output signals respectively output from the numerous second exposed end portions (822) when the measurement input signal is input to the first exposed end portion (821) as the input-side identification target, and a term negatively correlated with the voltage value of the measurement output signal output from the second exposed end portion (822) as the output-side identification target when the measurement input signal is input to the first exposed end portion (821) as the input-side identification target.

[5] A coupling capacitance estimation device, comprising: numerous input electrodes (242) arranged so as to respectively face first exposed end portions (821) of numerous insulated wires (82) exposed at one end of a multicore cable (8); numerous output electrodes (412) arranged so as to respectively face second exposed end portions (822) of the numerous insulated wires (82) exposed at another end of the multicore cable (8); a measurement unit (611) to perform measurement of a voltage value of a measurement output signal that is output by capacitive coupling from the second exposed end portion (822) through the output electrode (412) when a measurement input signal is input by capacitive coupling from the input electrode (242) to the first exposed end portion (821), with a plurality of predetermined different combinations of the input electrodes (242) to input the measurement input signal and the output electrodes (412) to output the measurement output signal; and an estimation unit (612) to estimate, based on the voltage values of a plurality of the measurement output signals measured by the measurement unit (611), respective coupling capacitances between the numerous input electrodes (242) and the numerous first exposed end portions (821) facing each other and respective coupling capacitances between the numerous output electrodes (412) and the numerous second exposed end portions (822) facing each other.

[6A] A method for manufacturing a multicore cable assembly that comprises a multicore cable (8) comprising numerous insulated wires (82) and a sheath (81) collectively covering the numerous insulated wires (82), a first connection target member electrically connected to first exposed end portions (821) of the numerous insulated wires (82) exposed from the sheath (81) at one end of the multicore cable (8), and a second connection target member electrically connected to second exposed end portions of the numerous insulated wires (82) exposed from the sheath (81) at another end of the multicore cable (8), the method comprising: identifying which second exposed end portion corresponds to the first exposed end portion (821) as an identification target among the numerous first exposed end portions (821); and based on identification results for the numerous first exposed end portions (821) and the numerous second exposed end portions by the identifying, electrically connecting the numerous first exposed end portions (821) to the first connection target member and electrically connecting the numerous second exposed end portions to the second connection target member, wherein the identifying comprises arranging numerous input electrodes (242) so as to respectively face the numerous first exposed end portions (821), arranging numerous output electrodes (412) so as to respectively face the numerous second exposed end portions, performing measurement of a voltage value of a measurement output signal that is output by capacitive coupling from the second exposed end portion through the output electrode (412) when a measurement input signal is input by capacitive coupling from the input electrode (242) to the first exposed end portion (821), with a plurality of predetermined different combinations of the input electrodes (242) to input the measurement input signal and the output electrodes (412) to output the measurement output signal, estimating respective coupling capacitances between the numerous input electrodes (242) and the numerous first exposed end portions (821) facing each other and respective coupling capacitances between the numerous output electrodes (412) and the numerous second exposed end portions facing each other based on the measured voltage values of a plurality of the measurement output signals, inputting an identification input signal by capacitive coupling from the input electrode (242) to the first exposed end portion (821) as the input-side identification target among the numerous first exposed end portions (821), also inputting an auxiliary signal with an opposite phase to the identification input signal, by capacitive coupling, from the input electrode (242) to the first exposed end portion (821) among the numerous first exposed end portions (821) except the first exposed end portion (821) as the input-side identification target, and measuring voltage values of identification output signals that are output by capacitive coupling respectively from the numerous second exposed end portions through the output electrodes (412), calculating correction voltage values by multiplying the respective voltage values of the identification output signals measured at the numerous second exposed end portions by a correction coefficient calculated using estimated values of the coupling capacitances, and based on the calculated correction voltage values, identifying the second exposed end portion corresponding to the first exposed end portion (821) as the input-side identification target.

[6B] A method for manufacturing a multicore cable assembly that comprises a multicore cable (8) comprising numerous insulated wires (82) and a sheath (81) collectively covering the numerous insulated wires (82), a first connection target member electrically connected to first exposed end portions (821) of the numerous insulated wires (82) exposed from the sheath (81) at one end of the multicore cable (8), and a second connection target member electrically connected to second exposed end portions (822) of the numerous insulated wires (82) exposed from the sheath (81) at another end of the multicore cable (8), the method comprising: identifying which second exposed end portion (822) corresponds to the first exposed end portion (821) as an identification target among the numerous first exposed end portions (821); and based on identification results for the numerous first exposed end portions (821) and the numerous second exposed end portions (822) by the identifying, electrically connecting the numerous first exposed end portions (821) to the first connection target member and electrically connecting the numerous second exposed end portions (822) to the second connection target member, wherein the identifying comprises arranging numerous input electrodes (242) so as to respectively face the numerous first exposed end portions (821), arranging numerous output electrodes (412) so as to respectively face the numerous second exposed end portions (822), performing measurement of a voltage value of a measurement output signal that is output by capacitive coupling from the second exposed end portion (822) through the output electrode (412) when a measurement input signal is input by capacitive coupling from the input electrode (242) to the first exposed end portion (821), with a plurality of predetermined different combinations of the input electrodes (242) to input the measurement input signal and the output electrodes (412) to output the measurement output signal, estimating respective coupling capacitances between the numerous input electrodes (242) and the numerous first exposed end portions (821) facing each other and respective coupling capacitances between the numerous output electrodes (412) and the numerous second exposed end portions (822) facing each other based on the measured voltage values of a plurality of the measurement output signals, performing measurement of a voltage value of an identification output signal that is output by capacitive coupling from the second exposed end portion (822) as an output-side identification target among the numerous second exposed end portions (822) through the output electrode (412) when an identification input signal is input by capacitive coupling from the input electrode (242) to the first exposed end portion (821) as an input-side identification target among the numerous first exposed end portions (821) and also an auxiliary signal with an opposite phase to the identification input signal is input by capacitive coupling from the input electrode (242) to a predetermined first exposed end portion (821) among the numerous first exposed end portions (821) except the first exposed end portion (821) as the input-side identification target, until all the second exposed end portions (822) become the output-side identification target, using an estimated value of coupling capacitance between the second exposed end portion (822) as the output-side identification target and the output electrode (412), calculating a correction voltage value by multiplying the voltage value of the identification output signal output from the second exposed end portion (822) as the output-side identification target by a correction coefficient negatively correlated with the coupling capacitance between the second exposed end portion (822) as the output-side identification and the output electrode (412), and based on the calculated correction voltage value, identifying the second exposed end portion (822) corresponding to the first exposed end portion (821) as the input-side identification target.

Although the embodiments of the invention have been described, the invention according to claims is not to be limited to the embodiments described above. Further, please note that not all combinations of the features described in the embodiments are necessary to solve the problem of the invention. In addition, the invention can be appropriately modified and implemented without departing from the gist thereof.

For example, although the estimated values of the coupling capacitances estimated by the estimation unit are used to calculate the correction voltage values when identifying the correspondence relations between the numerous first exposed end portions 821 and the numerous second exposed end portions 822 in each embodiment, it is not limited thereto. For example, when the estimated value of the coupling capacitance between the insulated wire and the electrode at a certain position is small, it can be determined from the estimated value of the coupling capacitance that there is a defect how the insulated wire is fixed, or a defect in the electrode, at this position. Therefore, the estimated value may be used to make such a determination.

The invention claimed is:

1. A coupling capacitance estimation method, comprising:
arranging numerous input electrodes so as to respectively face first exposed end portions of numerous insulated wires exposed at one end of a multicore cable;
arranging numerous output electrodes so as to respectively face second exposed end portions of the numerous insulated wires exposed at another end of the multicore cable;
performing measurement of a voltage value of a measurement output signal that is output by capacitive coupling from a second exposed end portion through an output electrode when a measurement input signal is input by capacitive coupling from an input electrode to a first exposed end portion, with a plurality of predetermined different combinations of the input electrodes to input the measurement input signal and the output electrodes to output the measurement output signal; and
based on the measured voltage values of a plurality of the measurement output signals, estimating respective coupling capacitances between the numerous input electrodes and the numerous first exposed end portions facing each other and respective coupling capacitances between the numerous output electrodes and the numerous second exposed end portions facing each other.

2. A method for identifying corresponding ends of a multicore cable that is a method for identifying correspondence relations between the numerous first exposed end portions and the numerous second exposed end portions by using the coupling capacitance estimation method according to claim 1, the method comprising:
inputting an identification input signal by capacitive coupling from the input electrode to the first exposed end portion as an input-side identification target among the numerous first exposed end portions, also inputting an auxiliary signal with an opposite phase to the identification input signal, by capacitive coupling, from the input electrode to the first exposed end portion among the numerous first exposed end portions except the first exposed end portion as the input-side identification target, and measuring voltage values of identification output signals that are output by capacitive coupling respectively from the numerous second exposed end portions through the output electrodes;
calculating correction voltage values by multiplying respective voltage values of the identification output signals measured at the numerous second exposed end portions by a correction coefficient calculated using estimated values of coupling capacitances estimated by the coupling capacitance estimation method; and
based on the calculated correction voltage values, identifying the second exposed end portion corresponding to the first exposed end portion as the input-side identification target.

3. The method according to claim 2, wherein the correction coefficient multiplied by the voltage value of the identification output signal is a product of a term correlated with coupling capacitance between the second exposed end portion designated to output the identification output signal and the output electrode and a term correlated with reference coupling capacitance indicating a predetermined reference value for coupling capacitances between the numerous second exposed end portions and the numerous output electrodes facing each other.

4. A method for identifying correspondence relations between first exposed end portions of numerous insulated wires exposed at one end of a multicore cable and second exposed end portions of numerous insulated wires exposed at another end of the multicore cable,
arranging numerous input electrodes so as to respectively face the first exposed end portions of the numerous insulated wires;
arranging numerous output electrodes so as to respectively face the second exposed end portions of the numerous insulated wires;
inputting an identification input signal by capacitive coupling from an input electrode to the first exposed end portion as an input-side identification target among the numerous first exposed end portions, also inputting an auxiliary signal with an opposite phase to the identification input signal, by capacitive coupling, from the input electrode to the first exposed end portion among the numerous first exposed end portions except the first exposed end portion as the input-side identification target, and measuring voltage values of identification output signals that are output by capacitive coupling respectively from the numerous second exposed end portions through the output electrodes;
inputting a measurement input signal by capacitive coupling from the input electrode to the first exposed end portion as the input-side identification target, and measuring voltage values of measurement output signals that are output by capacitive coupling respectively from the numerous second exposed end portions,
calculating correction voltage values by multiplying respective voltage values of the identification output signals measured at the numerous second exposed end portions by a correction coefficient,
wherein the correction coefficient is a product of a term correlated with an average of the voltage values of the measurement output signals respectively output from the numerous second exposed end portions when the measurement input signal is input to the first exposed end portion as the input-side identification target, and a term correlated with the voltage value of the measurement output signal output from a second exposed end portion designated to output the identification output signal when the measurement input signal is input to the first exposed end portion as the input-side identification target; and based on the calculated correction voltage values, identifying the second exposed end portion corresponding to the first exposed end portion as the input-side identification target.

5. A method for manufacturing a multicore cable assembly that comprises a multicore cable comprising numerous insulated wires and an outer covering collectively covering the numerous insulated wires, a first connection target member electrically connected to first exposed end portions of the numerous insulated wires exposed from the outer covering at one end of the multicore cable, and a second connection target member electrically connected to second exposed end portions of the numerous insulated wires exposed from the outer covering at another end of the multicore cable, the method comprising:

identifying which of a second exposed end portion corresponds to a first exposed end portion as an input-side identification target among numerous first exposed end portions; and based on identification results for the numerous first exposed end portions and numerous second exposed end portions by the identifying, electrically connecting the numerous first exposed end portions to the first connection target member and electrically connecting the numerous second exposed end portions to the second connection target member, wherein the identifying comprises:

arranging numerous input electrodes so as to respectively face the numerous first exposed end portions, arranging numerous output electrodes so as to respectively face the numerous second exposed end portions, performing measurement of a voltage value of a measurement output signal that is output by capacitive coupling from the second exposed end portion through an output electrode when a measurement input signal is input by capacitive coupling from an input electrode to the first exposed end portion, with a plurality of predetermined different combinations of the input electrodes to input the measurement input signal and the output electrodes to output the measurement output signal, estimating respective coupling capacitances between the numerous input electrodes and the numerous first exposed end portions facing each other and respective coupling capacitances between the numerous output electrodes and the numerous second exposed end portions facing each other based on measured voltage values of a plurality of the measurement output signals, inputting an identification input signal by capacitive coupling from the input electrode to the first exposed end portion as the input-side identification target among the numerous first exposed end portions, also inputting an auxiliary signal with an opposite phase to the identification input signal, by capacitive coupling, from the input electrode to the first exposed end portion among the numerous first exposed end portions except the first exposed end portion as the input-side identification target, and measuring voltage values of identification output signals that are output by capacitive coupling respectively from the numerous second exposed end portions through the output electrodes, calculating correction voltage values by multiplying respective voltage values of the identification output signals measured at the numerous second exposed end portions by a correction coefficient calculated using estimated values of the coupling capacitances, and based on the calculated correction voltage values, identifying the second exposed end portion corresponding to the first exposed end portion as the input-side identification target.

\* \* \* \* \*